United States Patent
Tait et al.

(10) Patent No.: US 9,796,940 B2
(45) Date of Patent: Oct. 24, 2017

(54) PROCESSED BIOMASS PELLETS FROM ORGANIC-CARBON-CONTAINING FEEDSTOCK

(71) Applicants: Carleton Drew Tait, North Salt Lake, UT (US); Douglas M Van Thorre, Minneapolis, MN (US); Michael L Catto, Moore, SC (US); Philip James Scalzo, South Jordan, UT (US)

(72) Inventors: Carleton Drew Tait, North Salt Lake, UT (US); Douglas M Van Thorre, Minneapolis, MN (US); Michael L Catto, Moore, SC (US); Philip James Scalzo, South Jordan, UT (US)

(73) Assignee: Biomass Energy Enhancements, LLC, Zirconia, NC (US)

( * ) Notice: Subject to any disclaimer, the term of this patent is extended or adjusted under 35 U.S.C. 154(b) by 0 days.

(21) Appl. No.: 14/623,430

(22) Filed: Feb. 16, 2015

(65) Prior Publication Data

US 2015/0361367 A1    Dec. 17, 2015

Related U.S. Application Data

(63) Continuation-in-part of application No. 14/305,143, filed on Jun. 16, 2014.

(51) Int. Cl.
*C10L 5/00* (2006.01)
*C10L 5/08* (2006.01)
(Continued)

(52) U.S. Cl.
CPC ................ *C10L 5/08* (2013.01); *C10L 5/363* (2013.01); *C10L 5/42* (2013.01); *C10L 5/442* (2013.01);
(Continued)

(58) Field of Classification Search
CPC .. C10L 5/08; C10L 5/442; C10L 5/445; C10L 5/42; C10L 5/363;
(Continued)

(56) References Cited

U.S. PATENT DOCUMENTS 3,950,143 A    4/1976  Pyle
4,136,207 A    1/1979  Bender
(Continued)

FOREIGN PATENT DOCUMENTS

EP          2615156 A1    7/2013
NL          1029909 C2    3/2007
WO      2013092884 A1    6/2013

OTHER PUBLICATIONS

Gary Brodeur et al.;Chemical and Physicochemical Pretreatment of Lignocellulosic Biomass: A Review; SAGE—Hindawi Access to Research, Enzyme Research, vol. 2011, Article IC 787532; 17 pages.

(Continued)

*Primary Examiner* — Cephia D Toomer
(74) *Attorney, Agent, or Firm* — Berggren Law Offices, LLC; William G. Berggren; Stephen F. Wolf

(57) ABSTRACT

A renewable processed biomass pellet composition made with a pelletizing sub-system from a processed organic-carbon-containing feedstock made with a beneficiation sub-system is described. Renewable biomass feedstock passed through a beneficiation sub-system to reduce water content to below at least 20 wt % and water-soluble intracellular salt reduction of at least 60 % from that of unprocessed organic-carbon-containing feedstock on a dry basis. The processed feedstock is introduced into a pelletizing sub-system to result in renewable processed biomass pellets having an energy density of at least 17 MMBTU/ton (20 GJ/MT) a water content of less than 20 wt %, and water-soluble intracellular salt content that is decreased by at least 60 wt (Continued)

% on a dry basis for the processed organic-carbon-containing feedstock from that of the unprocessed organic-carbon-containing feedstock, and made with 40 % less energy than expended to make current biomass pellets.

7 Claims, 14 Drawing Sheets

(51) Int. Cl.
    *C10L 5/44* (2006.01)
    *C10L 5/42* (2006.01)
    *C10L 5/36* (2006.01)

(52) U.S. Cl.
    CPC ....... *C10L 5/445* (2013.01); *C10L 2200/0469* (2013.01); *C10L 2290/06* (2013.01); *C10L 2290/08* (2013.01); *C10L 2290/28* (2013.01); *C10L 2290/30* (2013.01); *C10L 2290/46* (2013.01); *C10L 2290/545* (2013.01); *Y02E 50/10* (2013.01); *Y02E 50/30* (2013.01)

(58) Field of Classification Search
    CPC ......... C10L 2200/0469; C10L 2290/30; C10L 2290/06; C10L 2290/08; C10L 2290/46; C10L 2290/545; C10L 2290/28; Y02E 50/30
    See application file for complete search history.

(56) References Cited

U.S. PATENT DOCUMENTS

| | | |
|---|---|---|
| 4,235,707 A | 11/1980 | Burke, Jr. |
| 4,356,196 A | 10/1982 | Hultquist |
| 4,398,917 A * | 8/1983 | Reilly ................ C10L 5/44 264/109 |
| 4,600,590 A | 7/1986 | Dale |
| 4,644,060 A | 2/1987 | Chou |
| 5,037,663 A | 8/1991 | Dale |
| 5,171,592 A | 12/1992 | Holtzapple et al. |
| 5,939,544 A | 8/1999 | Karstens et al. |
| 5,980,595 A | 11/1999 | Andrews |
| 6,106,888 A | 8/2000 | Dale et al. |
| 6,176,176 B1 | 1/2001 | Dale et al. |
| 6,506,223 B2 | 1/2003 | White |
| 7,252,691 B2 | 8/2007 | Philipson |
| 8,349,034 B2 | 1/2013 | Calabrese et al. |
| 8,491,693 B2 | 7/2013 | Burnham |
| 8,585,786 B2 | 11/2013 | Drozd et al. |
| 2007/0031918 A1 | 2/2007 | Dunson, Jr. et al. |
| 2007/0037259 A1 | 2/2007 | Hennessey et al. |
| 2009/0053771 A1 | 2/2009 | Dale et al. |
| 2009/0272027 A1 | 11/2009 | Ruiters |
| 2010/0162619 A1 | 7/2010 | Peus |
| 2010/0281767 A1 | 11/2010 | Zeeck |
| 2010/0300368 A1 | 12/2010 | Myers et al. |
| 2012/0110896 A1 | 5/2012 | Coronella et al. |
| 2013/0200181 A1 | 8/2013 | Lanning et al. |
| 2015/0052805 A1 | 2/2015 | Catto et al. |

OTHER PUBLICATIONS

Hugh McLaughlin et al.; All Biovhars are Not Equal, and Hot to Tell Them Apart; Versions 2 (Oct. 2009) which supercedes the digital reprint issued at the North American Biochar Conference, Boulder, CO; Aug. 2009; 36 pages.

\* cited by examiner

| Biomass Dewatering Alternatives 50% to 12% Moisture | | | | | | | |
|---|---|---|---|---|---|---|---|
| | Units | Mechanical | Physiothermal | Thermal | Physiochemical | | |
| | | | | | CH3OH+H2O | H2CO3+H2O | H2O Only |
| Capable of reducing moisture content to <20% | | No | Yes | Yes | Yes | Yes | Yes |
| Soluable Salts Extraction | | 30% - 50% | 0% - 25 | ~0% | 75% - 90% | 75% - 90% | 75% - 90% |
| Product Suitable for Bacteria/Enzyme Digestion | | Yes | Yes | Yes | Yes | Yes | No |
| Product Suitable for Co-firing w/ Coal @ > 30% | | No | No | No | Yes | Yes | Yes |
| Scalable to 20 TPH | | Yes | Yes | Yes | Yes | Yes | Yes |
| Capital Cost Multiplier | | 3 | 6 | 0.85 | 1 | 1 | 1 |
| O&M Multiplier | | 1.2 | 1.2 | 1.2 | 1 | 1 | 1 |
| Availability Multiplier | | 0.8 | 0.85 | 0.9 | 1 | 1 | 1 |
| | | | | | | | |
| *Thermal Energy Req* | | | | | | | |
| Working Fluid | | n/a | H2O | H2O | Ammonia | MeOH | H2O |
| Weight of Working Fluid/lb biomass | lb | 0.38 | 0.38 | 0.38 | 1.50 | 1.50 | 1.50 |
| Specific Heat | BTU/lb-°F | n/a | 1.00 | 1.00 | 0.52 | 0.61 | 1.00 |
| Heat of Vaporization | BTU/lb | n/a | 970.60 | 970.60 | 550.00 | 473.00 | 970.60 |
| T1 (initial temperature after SS) | °F | n/a | 59 | 59 | 59 | 59 | 59 |
| T2 (final temperature) | °F | 59 | 212 | 212 | 125 | 347 | 347 |
| % liquid converted to Steam | % | n/a | 100% | 100% | 20% | 20% | 19% |
| Energy Recovered % from Delta T | % | n/a | 10% | 20% | 90% | 90% | 90% |
| Energy Recovered % from Steam | % | n/a | 30% | 30% | 70% | 70% | 70% |
| Delta T Biomass (T2 - T1) | °F | n/a | 153 | 153 | 66 | 288 | 288 |
| Energy Req. for Delta T | BTU/lb | n/a | 58.14 | 58.14 | 51.48 | 261.36 | 432.00 |
| Energy Req. for Vaporization | BTU/lb | n/a | 368.83 | 368.83 | 165.00 | 141.90 | 276.62 |
| Total Energy Required (Gross) | BTU/lb | n/a | 426.97 | 426.97 | 216.48 | 403.26 | 708.62 |
| Energy Recovered from Delta T | BTU/lb | n/a | 5.81 | 11.63 | 46.33 | 235.22 | 388.80 |
| Energy Recovered from Steam | BTU/lb | n/a | 110.65 | 110.65 | 115.50 | 99.33 | 193.63 |
| Total Energy Recovered | BTU/lb | n/a | 116.46 | 122.28 | 161.83 | 334.55 | 582.43 |
| Total Energy Required (Net) | BTU/lb | 0.00 | 310.51 | 304.69 | 54.65 | 68.71 | 126.19 |
| Total Thermal Energy Req. /Ton | MMBTU/WT | 0 | 0.62 | 0.61 | 0.1093 | 0.1374 | 0.25 |
| | | | | | | | |
| *Mecahnical Energy* | | | | | | | |
| Chipping | BTU/lb | 90.00 | 90.00 | 48.00 | 48.00 | 48.00 | 48.00 |
| Process | BTU/lb | 100.00 | 50.00 | 10.00 | 22.00 | 22.00 | 22.00 |
| Packaging | BTU/lb | 15.00 | 0.00 | 25.00 | 15.00 | 15.00 | 15.00 |
| Total Mechanical Energy Required | BTU/lb | 205.00 | 140.00 | 83.00 | 85.00 | 85.00 | 85.00 |
| Total Mech. Energy Req. /Ton | MMBTU/WT | 0.41 | 0.28 | 0.17 | 0.17 | 0.17 | 0.17 |
| Total Energy Required/Pound | BTU/lb | 205.00 | 450.51 | 387.69 | 139.65 | 153.71 | 211.19 |
| Total Energy Required/Ton (1) | MMBTU/WT | 0.41 | 0.90 | 0.78 | 0.28 | 0.31 | 0.42 |
| Illustrative Cost of Req. Energy (Diesel @$4.00/Gal) | $/WT | $11.71 | $25.74 | $22.15 | $7.98 | $8.78 | $12.07 |
| (1) Mechanical method cannot achieve 12% moisture content. | | | | | | | |

Fig. 7

|  | Herbaceous Plants | Soft Woods | Hard Woods |
|---|---|---|---|
| Wet Fiber Disruption | | | |
| • Solvent medium | Water | Water; Water/Methanol | Water |
| • Residence time, min. | 15 to 25 | 20 to 35 | 30 to 45 |
| • Temperature profile, °C | 130 to 160 | 165 to 205 | 180 to 215 |
| • Pressure profile, max psig | 260 to 280 | 280-385 water; 640-650 $H_2O$/MeOH | 375 to 425 |
| Vapor Explosion | | | |
| • Initial Pressure Drop, psi. | 230 to 250 | 250-350 water; 600-620 $H_2O$/MeOH | 345 to 400 |
| • Explosive duration, milliseconds | 50 | 50 | 50 |
| Compaction | | | |
| • Pressure plate patterned, Y/N. | Y | Both Y and N | Both Y and N |
| Starting water content, % | 70 to 80 | 45 to 75 | 40 to 50 |
| Processed water content, % | 4 to 15 | 4 to 15 | 4 to 15 |
| % Fixed carbon (d/b) (before->after) | 25 to 50 ---> 40 to 65 | 20 to 35 ---> 40 to 55 | 40 to 50 ---> 45 to 55 |
| % Volatiles (d/b) (before->after) | 40 to 70 ---> 30 to 40 | 60 to 80 ---> 30 to 50 | 40 to 50 ---> 35 to 50 |
| % Ash (d/b) (before->after) | 5 to 15 ---> 5 to 10 | 3 to 6 ---> 1 to 3 | 1 to 5 ---> $\leq 3$ |
| Heat Content, LHV (before->after), BTU/lb | 1,500 to 2,500 ---> 7,000 to 10,500 | 1,900 to 4,600---> 9,000 to 11,000 | 3,000 to 5,000 ---> 9,000 to 11,000 |

Fig. 12

PROCESSED BIOMASS PELLETS FROM ORGANIC-CARBON-CONTAINING FEEDSTOCK

FIELD OF THE INVENTION

The present invention relates generally to the production of solid biomass fuel from an organic-carbon-containing feedstock.

BACKGROUND OF THE INVENTION

The vast majority of fuels are distilled from crude oil or obtained from natural gas pumped from limited underground reserves, or mined from coal. As the earth's crude oil supplies become more difficult and expensive to collect and there are growing concerns about the environmental effects of coal other than clean anthracite coal, the world-wide demand for energy is simultaneously growing. Over the next ten years, depletion of the remaining world's easily accessible crude oil reserves, natural gas reserves, and low-sulfur bituminous coal reserves will lead to a significant increase in cost for fuel obtained from crude oil, natural gas, and coal.

The search to find processes that can efficiently convert biomass to fuels and by-products suitable for transportation and/or heating is an important factor in meeting the ever-increasing demand for energy. In addition, processes that have solid byproducts that have improved utility are also increasingly in demand.

Biomass is a renewable organic-carbon-containing feedstock that contains plant cells and has shown promise as an economical source of fuel. However, this feedstock typically contains too much water and contaminants such as water-soluble salts to make it an economical alternative to common sources of fuel such as coal, petroleum, or natural gas.

Historically, through traditional mechanical/chemical processes, plants would give up a little less than 25 weight percent of their moisture. And, even if the plants were sun or kiln-dried, the natural and man-made chemicals and water-soluble salts that remain in the plant cells combine to create corrosion and disruptive glazes in furnaces. Also, the remaining moisture lowers the heat-producing million British thermal units per ton (MMBTU per ton) energy density of the feedstock thus limiting a furnace's efficiency. A BTU is the amount of heat required to raise the temperature of one pound of water one degree Fahrenheit, and 1 MM BTU/ton is equivalent to 1.163 Giga joules per metric tone (GJ/MT. Centuries of data obtained through experimentation with a multitude of biomass materials all support the conclusion that increasingly larger increments of energy are required to achieve increasingly smaller increments of bulk density improvement. Thus, municipal waste facilities that process organic-carbon-containing feedstock, a broader class of feedstock that includes materials that contain plant cells, generally operate in an energy deficient manner that costs municipalities money. Similarly, the energy needed to process agricultural waste, also included under the general term of organic-carbon-containing feedstock, for the waste to be an effective substitute for coal or petroleum are not commercial without some sort of governmental subsidies and generally contain unsatisfactory levels of either or both water or water-soluble salts. The cost to suitably transport and/or prepare such feedstock in a large enough volume to be commercially successful is expensive and currently uneconomical. Also, the suitable plant-cell-containing feedstock that is available in sufficient volume to be commercially useful generally has water-soluble salt contents that result in adverse fouling and contamination scenarios with conventional processes. Suitable land for growing a sufficient amount of energy crops to make economic sense typically are found in locations that result in high water-soluble salt content in the plant cells, i.e., often over 4000 mg/kg on a dry basis.

Attempts have been made to prepare organic-carbon-containing feedstock as a solid renewable fuel, coal substitute, or binders for the making of coal aggregates from coal fines, but these have not been economically viable as they generally contain water-soluble salts that can contribute to corrosion, fouling, and slagging in combustion equipment, and have high water content that reduces the energy density to well below that of coal in large part because of the retained moisture. However, there remains a need for biomass or biochar as it is a clean renewable source of solid fuel if it could be made cost-effectively with a more substantial reduction in its content of water and water-soluble salt for use as coal substitutes or as high energy binders with coal fines.

Solid byproducts with improved beneficial properties are an important factor in meeting the ever-increasing demand for energy. The present invention fulfills these needs and provides various advantages over the prior art.

SUMMARY OF THE INVENTION

Embodiments of the present invention are directed to a composition from renewable, unprocessed organic-carbon-containing feedstock and a process. The composition is a processed biomass pellet composition that comprises a processed organic-carbon-containing feedstock with characteristics that include an energy density of at least 17 MMBTU/ton (20 GJ/MT), a water content of less than 20 wt %, and a water-soluble intracellular salt content that is decreased more than 60 wt % on a dry basis for the processed organic-carbon-containing feedstock from that of unprocessed organic-carbon-containing feedstock. The processed biomass pellet is made with a system configured to convert renewable unprocessed organic-carbon-containing feedstock into the processed organic-carbon-containing feedstock with a beneficiation sub-system, and into the processed biomass pellets with a pelletizing sub-system that is made with 40% less energy than expended to make an unprocessed biomass pellet.

The process of making the processed biomass pellet composition comprises three steps. The first step is to input into a system, comprising a first and a second subsystem, a renewable unprocessed organic-carbon-containing feedstock that includes free water, intercellular water, intracellular water, intracellular water-soluble salts, and at least some plant cells comprising cell walls that include lignin, hemicellulose, and microfibrils within fibrils. The second step is to pass the unprocessed organic-carbon-containing feedstock through the first sub-system, a beneficiation sub-system process, to result in processed organic-carbon-containing feedstock having a water content of less than 20 wt % and a water soluble intracellular salt content that is reduced by at least 60 wt % on a dry basis for the processed organic-carbon-containing feedstock from that of the unprocessed organic-carbon-containing feedstock. The third step is to pass the processed organic-carbon-containing feedstock through the second sub-system, a pelletizing sub-system process, to result in processed biomass pellets, a solid renewable fuel composition having an energy density of at least 17 MMBTU/ton (20 GJ/MT) a water content of less than 10 wt %, and water-soluble intracellular salt that is decreased by at least 60 wt % on a dry basis for the processed organic-carbon-containing feedstock from that of the unprocessed organic-carbon-containing feedstock, and made with 40% less energy than expended to make current unprocessed biomass pellets.

The invention is a processed biomass pellet that is a suitable clean coal substitute for devices that use coal as a feedstock to generate heat such as, for example, coal-fired boilers used to make electricity. The low salt content of the processed biomass pellets substantially reduces adverse corrosive wear and maintenance cleaning of the devices that is typical today. The uniform low water content and uniform, high energy density of the beneficiated organic-carbon-containing feedstock used to make the processed biomass pellets allow for a wide variety of renewable organic-carbon-containing feedstock to be used in pelletizing section of the process in a cost efficient manner. During the beneficiation section of the process, the substantial reduction of water-soluble salts reduces the adverse results that occur with the subsequent use of the processed organic-carbon-containing feedstock. In addition, energy needed to remove water from unprocessed organic-carbon-containing feedstock described above to a content of below 20 wt % and a substantial amount of the water-soluble salt with the invention is significantly less than for conventional processes. In some embodiments, the total cost per weight of the beneficiated feedstock is reduced by at least 60% of the cost to perform a similar task with known mechanical, physiochemical, or thermal processes to prepare renewable organic-carbon-containing feedstock for use in subsequent fuel making operations such as an oxygen-deficient thermal sub-system. In addition, processed biomass pellets can be made with 40% less energy than expended to make current unprocessed biomass pellets.

The above summary is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 7 is a table illustrating the estimated energy consumption needed to remove at least 75 wt % water-soluble salt from organic-carbon-containing feedstock and reduce water content from 50 wt % to 12 wt % with embodiments of the beneficiation sub-system of the invention compared with known processes.

FIG. 12 is a table showing relative process condition ranges and water and water-soluble salt content for three types of organic-carbon-containing feedstock used in the beneficiation sub-system.

Figure 1:
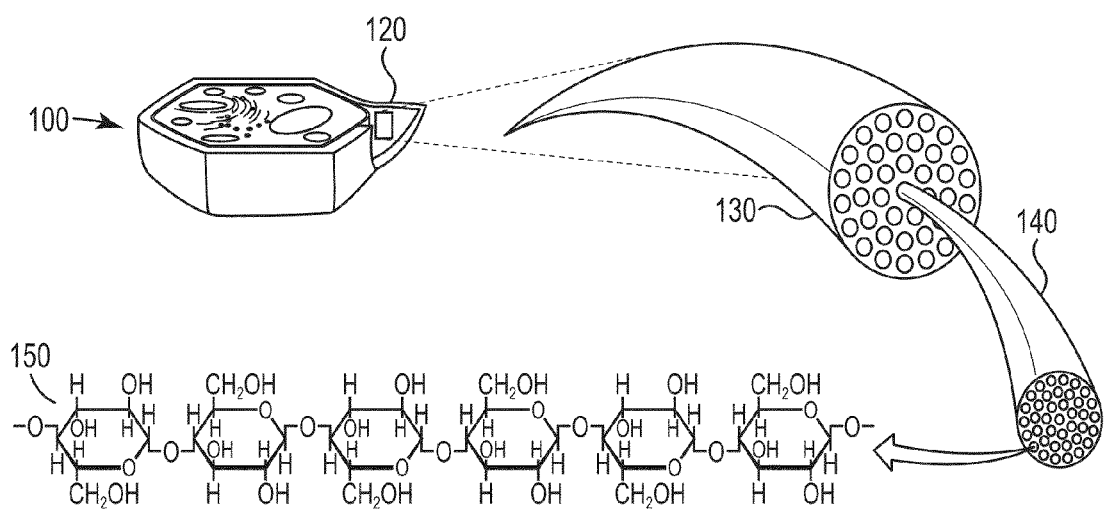
FIG. 1 is a diagram of a typical plant cell with an exploded view of a region of its cell wall showing the arrangement of fibrils, microfibrils, and cellulose in the cell wall.

While the invention is amenable to various modifications and alternative forms, specifics have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

The processed biomass pellets of the invention is a renewable solid fuel made from passing beneficiated processed organic-carbon-containing feedstock through a pelletizing system. The processed biomass pellets are similar to sub-bituminous coal in energy density. The processed biomass pellets of the invention have the advantages of coming from a renewable source, i.e., agricultural and plant materials, without the burdens of current biomass processes that are inefficient and remove less if any of the salt found in unprocessed renewable biomass. There are several aspects of the invention that will be discussed: processed biomass pellets, unprocessed renewable organic-carbon-containing feedstock, beneficiation sub-system, pelletizing sub-system, beneficiation sub-system process, and pelletizing sub-system process.

Processed Biomass Pellets

Biomass pellets made from renewable organic-carbon-containing feedstock is referred to as processed biomass pellets in this document. The processed biomass pellet of the invention comprises a solid carbon fuel comprising less than 20 wt % water, and water-soluble intracellular salt that is less than 60 wt % on a dry basis that of unprocessed organic-carbon-containing feedstock. The processed biomass pellet is made from unprocessed organic-carbon-containing feedstock that is converted into a processed organic-carbon-containing feedstock in a beneficiation sub-system, and that is then passed through a pelletizing sub-system. As used in this document, processed biomass pellets are a solid product of beneficiated organic-carbon-containing feedstock that is subsequently pelletized. Organic-carbon-containing feedstock used to make the processed biomass of the invention can contain mixtures of more than one renewable feedstock.

Coal has inorganic impurities associated with its formation underground over millions of years. The inorganic impurities are not combustible, appear in the ash after combustion of coal in such situations as, for example boilers, and contribute to air pollution as the fly ash particulate material is ejected into the atmosphere following combustion. The inorganic impurities result mainly from clay minerals and trace inorganic impurities washed into the rotting biomass prior to its eventual burial. An important group of precipitating impurities are carbonate minerals. During the early stages of coat formation, carbonate minerals such as iron carbonate are precipitated either as concretions (hard oval nodules up to tens of centimeters in size) or as infillings of fissures in the coal, Impurities such as sulfur and trace elements (including mercury, germanium, arsenic, and uranium) are chemically reduced and incorporated during coal formation. Most sulfur is present as the mineral pyrite ($FeS_2$), which may account for up to a few percent of the coal volume. Burning coal oxidizes these compounds, releasing oxides of sulfur ($SO$, $SO_2$, $SO_3$, $S_7O_2$, $S_6O_2$, $S_2O_2$, etc.), notorious contributors to acid rain. The trace elements (including mercury, germanium, arsenic, and uranium) were significantly enriched in the coal are also released by burning it, contributing to atmospheric pollution.

In contrast, the processed biomass pellets of the invention are cleaner than coal. The impurities discussed above are not present in any significant amount. In particular, processed biochar contains substantially no sulfur, Some embodiments have a sulfur content of less than 1000 mg/kg (0.1 wt %) or less than 1000 parts per million (ppm), some of less than 100 mg/kg (100 ppm, some of less than 10 mg/kg (10 ppm). In contrast coal has significantly more sulfur. The sulfur content in coal ranges of from 4000 mg/kg (0.4 wt %) to 40,000 mg/kg (4 wt %) and varies with type of coal. The typical sulfur content in anthracite coal is from 6000 mg/kg (0.6 wt %) to 7700 mg/kg (0.77 wt %). The typical sulfur content in bituminous coal is from 7000 mg/kg (0.7 wt %) to 40.000 mg/kg (4 wt %). The typical sulfur content in lignite coal is about 4000 mg/kg (0.4 wt %). Anthracite coal is too expensive for extensive use in burning. Lignite is poor quality coal, with a low energy density or BTU/wt.

In addition, processed biomass pellets have substantially no nitrate, arsenic, mercury or uranium. Some embodiments have a nitrate content of less than 500 mg/kg (500 ppm), some of less than 150 mg/kg (150 ppm), versus a nitrate content in coal of typically over 20,000 mg·kg (2 wt %), Some embodiments have a arsenic content of less than 2 mg/kg (2 ppm), some of less than 1 mg/kg (1 ppm), some less than 0.1 mg/kg or 100 parts per billion (ppb), and some less than 0.01 mg/kg (10 ppb) versus a arsenic content in coal of from over 1 mg/kg to over 70 mg/kg (1 ppm to 70 ppm). Some embodiments have a mercury content that is negligible, i.e., less than 1 microgram/kg (1 ppb), versus mercury content in coal of from 0.02 mg/kg (20 ppb) to 0.3 mg/kg (300 ppb). Similarly, some embodiments have a uranium content that is also negligible, i.e., less than 1 microgram/kg ppb), versus a uranium content in coal of from 20 mg/kg (20 ppm) to 315 mg/kg (315 ppm) with an average of about 65 mg/kg (ppm) and the uranium content in the ash from the coal with an average of about 210 mg/kg (210 ppm).

Other forms of char are also known. Some of these chars include, for example, char made by the pyrolysis of biomass, also known as charcoal. Charcoal has an energy density of about 26 MMBTU/tom (30 GJ/MT) and contains all of the water-soluble salt residues found in the starting biomass used to make the charcoal. Charcoal has various uses including, for example, a combustible fuel for generating heat for cooking and heating, as well as a soil amendment to supply minerals for fertilizing soils used for growing agricultural and horticultural products. Char has also been made by passing biomass through an open microwave oven similar to a bacon cooker that is exposed to the external atmosphere containing oxygen and contains pores with a variance similar to that made by a thermal process that has a liquid phase. In char made by thermal heat or infrared radiation, the heat is absorbed on the surface of any organic-carbon-containing feedstock and then is re-radiated to the next level at a lower temperature. This process is repeated over and over again until the thermal radiation penetrates to the inner most part of the feedstock. All the material in the feedstock absorbs the thermal radiation at its surfaces and different materials that make up the feedstock absorb the IR at different rates. A delta temperature of several orders of magnitude can exist between the surface and the inner most layers or regions of the feedstock. As a result, the solid organic-carbon-containing feedstock locally passes through a liquid phase before it is volatilized. This variation in temperature may appear in a longitudinal direction as well as radial direction depending on the characteristics of the feedstock, the rate of heating, and the localization of the heat source. This variable heat transfer from the surface to the interior of the feedstock can cause cold and hot spots, thermal shocks, uneven surface and internal expansion cracks, fragmentation, eject surface material and create aerosols. All of this can result in microenvironments that cause side reactions with the creation of many different end products. These side reactions are not only created in the feedstock but also in the volatiles that evaporate from the feedstock and occupy the vapor space in the internal reactor environment before being collected.

A common thermal process, pyrolysis, produces biochar, liquids, and gases from biomass by heating the biomass in a low/no oxygen environment. The absence of oxygen prevents combustion. Typical yields are 60% bio-oil, 20% biochar, and 20% volatile organic gases. High temperature pyrolysis in the presence of stoichiometric oxygen is known as gasification, and produces primarily syngas. By comparison, slow pyrolysis can produce substantially more char, on the order of about 50%.

Another thermal process is a sublimation process that produces biochar and gases from biomass in a low/no oxygen environment. The absence of oxygen also prevents combustion. Typical yields are 70% fuel gas and 30% biochar. Sublimation can occur in a vertical manner that lends itself to heavier/denser biomass feedstock such as, for example, wood and a horizontal manner that lends itself to lighter/less dense biomass feedstock such as, for example, wheat straw.

In contrast to thermal processes, the process to make char by microwave radiation uses heat that is absorbed throughout the organic-carbon-containing feedstock. The process uses microwave radiation from the oxygen-starved microwave process system. With microwave radiation, the solid part of the feedstock is nearly transparent to the microwave radiation and most of the microwave radiation just passes through. In contrast to the small absorption cross section of the solid feedstock, gaseous and liquid water strongly absorb the microwave radiation increasing the rotational and torsional vibrational energy of the water molecules. Therefore, the gaseous and liquid water that is present is heated by the microwaves, and these water molecules subsequently indirectly heat the solid feedstock. Thus any feedstock subjected to the microwave radiation field is exposed to the radiation evenly, inside to outside, no matter what the physical dimensions and content of the feedstock. With microwaves, the radiation is preferentially absorbed by water molecules that heat up. This heat is then transferred to the surrounding environment resulting in the feedstock being evenly and thoroughly heated.

In all of the above processes, water-soluble salt that is in all renewable organic-carbon-containing feedstock is not removed This has the adverse effect of increasing ash content in combusted char and increasing wear and maintenance costs from corrosion and slagging, a deposition of a viscous residue of impurities during combustion. In contrast, the process to make the processed biochar of the invention used a beneficiation sub-system to process the unprocessed organic-carbon—containing feedstock to remove most of the water and water-soluble salts, and an oxygen-deficient thermal sub-system to convert the processed organic-carbon-containing feedstock into a processed biochar.

In contrast, the processed biomass pellets of the invention contain much less water-soluble salt than that of currently known biomass pellets and known biochar. The use of a processed organic-carbon-containing feedstock rather than an unprocessed organic-carbon-containing feedstock used by the above known biomass and biochar result in significant improvements at a time when the impurities in coal and current biomass is receiving negative attention.

The processed biomass pellets of the invention have several improved characteristics when compared to a biomass pellets that use unprocessed organic-carbon-containing feedstock. First, the processed biochar contains significantly less salt than that produced from current processes that use similar unprocessed organic-carbon-containing feedstock. The salt in the processed organic-carbon-containing feedstock and thus in the resulting processed biochar is reduced by at least 60 wt % on a dry basis for the processed organic-carbon-containing feedstock from that of the salt content of the unprocessed organic-carbon-containing feedstock. As a result, the fixed carbon of the resulting processed biomass pellets is higher and the ash content is lower because there is less salt that forms ash during combustion. Also, the adverse effect of salt in the boiler is reduced, wear is slower, and maintenance cleaning of the equipment is less often and less arduous.

Second, the processed biochar has a high energy density, approaching that of sub-bituminous coal. The energy density is at least 17 MMBTU/ton (20 GJ/MT). In contrast, the energy density of biomass pellets from unprocessed organic-carbon-containing feedstock is no more than between 10 MMBTU/ton (12 GJ/MT) and 12 MMBTU/ton (14 GJ/MT).

Third, the processed biochar contains little if any pollutants normally associated with coal. These pollutants include, for example, mercury (neurotoxin), arsenic (carcinogen), and $S_xO_y$ when the coal is combusted. Processed biochar contains less than 0.1 wt % of any one of the above impurities, some embodiments contain less than 0.01 wt %, some less than 0.001 wt %, some less than 0.0001 wt %.

In some embodiments of the inventions, organic-carbon-containing feedstock used to make the processed biomass pellets of the invention can contain mixtures of more than one renewable feedstock when the processed organic-carbon-containing feedstock is made to have substantially uniform energy densities regardless of the type of organic-carbon-containing feedstock used.

Unprocessed Organic-Carbon-Containing Feedstock

Cellulose bundles, interwoven by hemicellulose and lignin polymer strands, are the stuff that makes plants strong and proficient in retaining moisture. Cellulose has evolved over several billion years to resist being broken down by heat, chemicals, or microbes. In a plant cell wall, the bundles of cellulose molecules in the microfibrils provide the wall with tensile strength. The tensile strength of cellulose microfibrils is as high as 110 kg/mm$^2$, or approximately 2.5 times that of the strongest steel in laboratory conditions. When cellulose is wetted, as in the cell walls, its tensile strength declines rapidly, significantly reducing its ability to provide mechanical support. But in biological systems, the cellulose skeleton is embedded in a matrix of pectin, hemicellulose, and lignin that act as waterproofing and strengthening material. That makes it difficult to produce fuels from renewable cellulose-containing biomass fast enough, cheap enough, or on a large enough scale to make economical sense. As used herein, organic-carbon-containing material means renewable plant-containing material that can be renewed in less than 50 years and includes plant material such as, for example herbaceous materials such as grasses, energy crops, and agricultural plant waste; woody materials such as tree parts, other woody waste, and discarded items made from wood such as broken furniture and railroad ties; and animal material containing undigested plant cells such as animal manure. Organic-carbon-containing material that is used as a feedstock in a process is called an organic-carbon-containing feedstock Unprocessed organic-carbon-containing material, also referred to as renewable biomass, encompasses a wide array of organic materials as stated above. It is estimated that the U.S. alone generates billions of tons of organic-carbon-containing material annually. As used in this document, beneficiated organic-carbon-containing feedstock is processed organic-carbon-containing feedstock where the moisture content has been reduced, a significant amount of dissolved salts have been removed, and the energy density of the material has been increased. This processed feedstock can be used as input for processes that make several energy-producing products, including, for example, liquid hydrocarbon fuels, solid fuel to supplant coal, and synthetic natural gas.

As everyone in the business of making organic-carbon-containing feedstock is reminded, the energy balance is the metric that matters most. The amount of energy used to beneficiate organic-carbon-containing feedstock and, thus, the cost of that energy must be substantially offset by the overall improvement realized by the beneficiation process in the first place. For example, committing 1000 BTU to improve the heat content of the processed organic-carbon-containing feedstock by 1000 BTU, all other things being equal, does not make economic sense unless the concurrent removal of a significant amount of the water-soluble salt renders previously unusable organic-carbon-containing feedstock usable as a fuel substitute for some processes such as boilers.

As used herein, organic-carbon-containing feedstock comprises free water, intercellular water, intracellular water, intracellular water-salts, and at least some plant cells comprising cell walls that include lignin, hemicellulose, and cellulosic microfibrils within fibrils. In some embodiments, the water-soluble salt content of the unprocessed organic-carbon-containing feedstock is at least 4000 mg/kg on a dry basis. In other embodiments the salt content may be more than 1000 mg/kg, 2000 mg/kg, or 3000 mg/kg. The content is largely dependent on the soil where the organic-carbon-containing material is grown, how the material was collected, and how the material is processed. Regions that are land rich and more able to allow land use for growing energy crops in commercial quantities often have alkaline soils that result in organic-carbon-containing feedstock with water-soluble salt content of over 4000 mg/kg.

Water-soluble salts are undesirable in processes that use organic-carbon-containing feedstock to create fuels. The salt tends to shorten the operating life of equipment through corrosion, fouling, or slagging when combusted. Some boilers have standards that limit the concentration of salt in fuels to less than 1500 mg/kg. This is to find a balance between availability of fuel for the boilers and expense of frequently cleaning the equipment and replacing parts. If economical, less salt would be preferred. In fact, salt reduction through beneficiation is an enabling technology for the use of salt-laden biomass (e.g. hogged fuels, mesquite, and pinyon-junipers) in boilers. Salt also frequently poisons catalysts and inhibits bacteria or enzyme use in processes used for creating beneficial fuels. While some salt concentration is tolerated, desirably the salt levels should be as low as economically feasible.

The water-soluble salt and various forms of water are located in various regions in plant cells. As used herein, plant cells are composed of cell walls that include microfibril bundles within fibrils and include intracellular water and intracellular water-soluble salt. FIG. 1 is a diagram of a typical plant cell with an exploded view of a region of its cell wall showing the arrangement of fibrils, microfibrils, and cellulose in the cell wall. A plant cell (100) is shown with a section of cell wall (120) magnified to show a fibril (130). Each fibril is composed of microfibrils (140) that include strands of cellulose (150). The strands of cellulose pose some degree of ordering and hence crystallinity.

Figure 2:
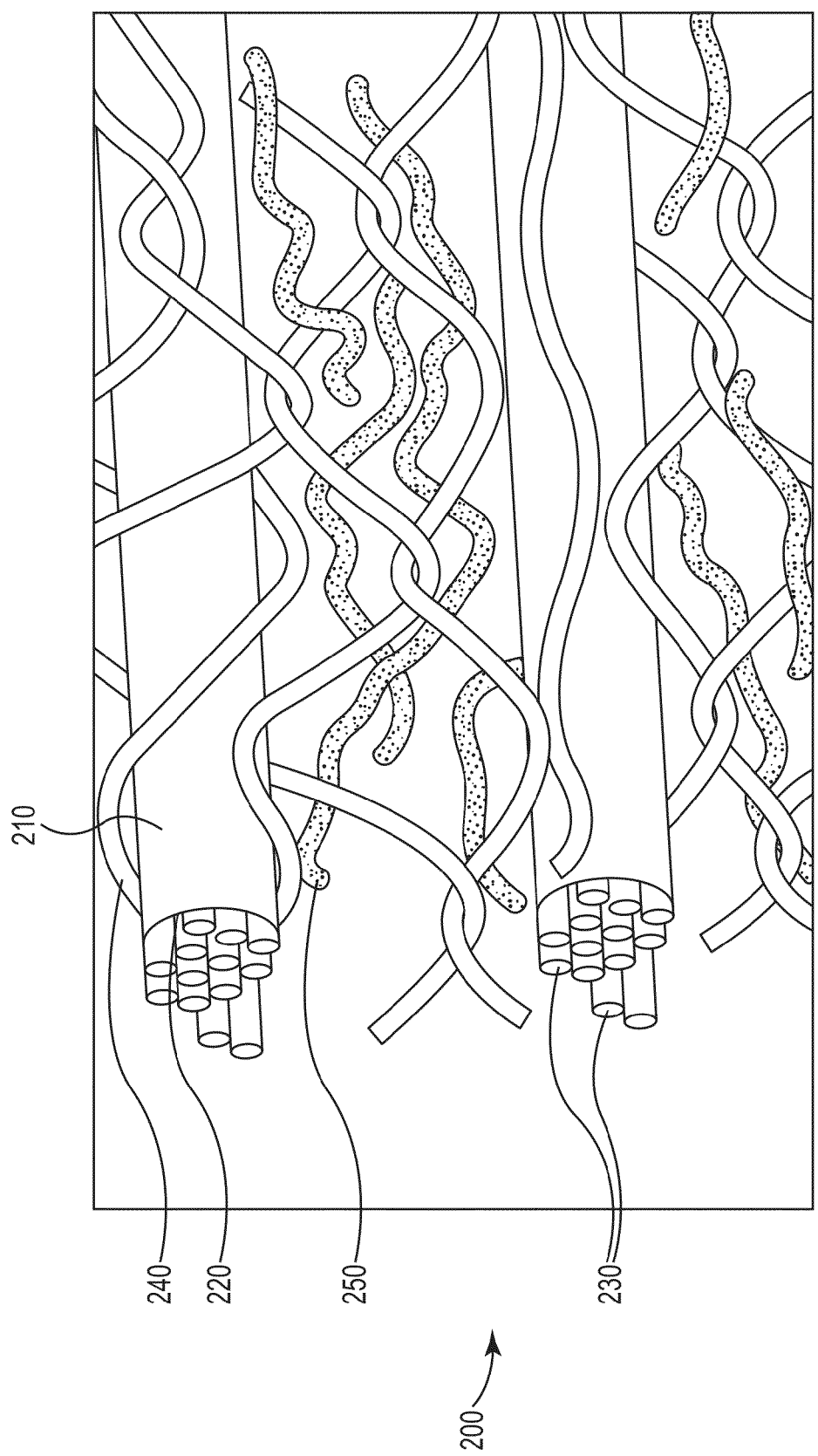
FIG. 2 is a diagram of a perspective side view of a part of two fibrils in a secondary plant cell wall showing fibrils containing microfibrils and connected by strands of hemicellulose and lignin

Plant cells have a primary cell wall and a secondary cell wall. The secondary cell wall varies in thickness with type of plant and provides most of the strength of plant material. FIG. 2 is a diagram of a perspective side view of a part of two fibrils bundled together in a secondary plant cell wall showing the fibrils containing microfibrils and connected by strands of hemicellulose, and lignin. The section of plant cell wall (200) is composed of many fibrils (210). Each fibril 210 includes a sheath (220) surrounding an aggregate of cellulosic microfibrils (230). Fibrils 210 are bound together by interwoven strands of hemicellulose (240) and lignin (250). In order to remove the intracellular water and intracellular water-soluble salt, sections of cell wall 200 must be punctured by at least one of unbundling the fibrils from the network of strands of hemicellulose 240 and lignin 250, decrystallizing part of the strands, or depolymerizing part of the strands.

The plant cells are separated from each other by intercellular water. An aggregate of plant cells are grouped together in plant fibers, each with a wall of cellulose that is wet on its outside with free water also known as surface moisture. The amount of water distributed within a specific organic-carbon-containing feedstock varies with the material. As an example, water is distributed in fresh bagasse from herbaceous plants as follows: about 50 wt % intracellular water, about 30 wt % intercellular water, and about 20 wt % free water. Bagasse is the fibrous matter at remains after sugarcane or sorghum stalks are crushed to extract their juice.

Figure 3:
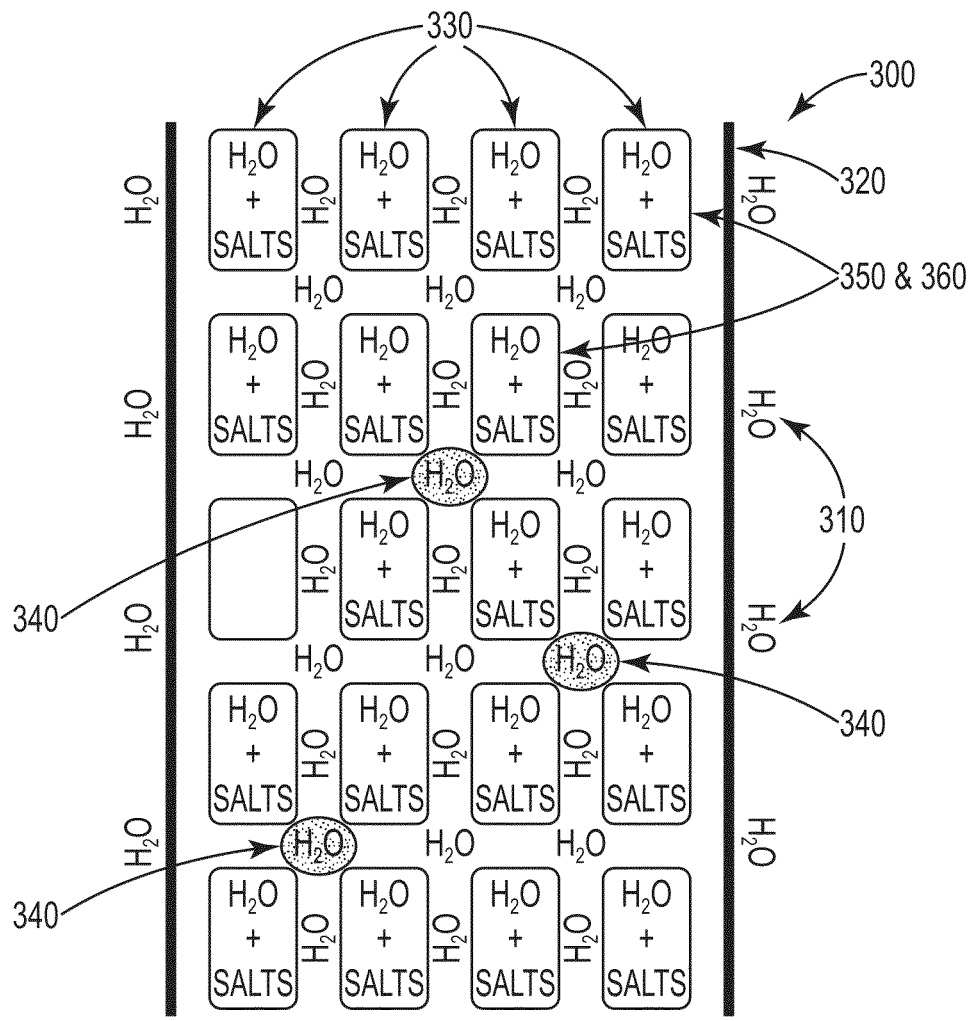
FIG. 3 is a diagram of a cross-sectional view of a section of bagasse fiber showing where water and water-soluble salts reside inside and outside plant cells.

FIG. 3 is diagram of a cross-sectional view of a fiber section of bagasse showing where water and water-soluble salts reside inside and outside plant cells. A fiber with an aggregate of plant cells (300) is shown with surface moisture (310) on the outer cellulosic wall (320). Within fiber 300 lays individual plant cells (330) separated by intercellular water (340). Within each individual plant cell 330 lays intracellular water (350) and intracellular water-soluble salt (360).

Conventional methods to beneficiate organic-carbon-containing feedstock include thermal processes, mechanical processes, and physiochemical processes. Thermal methods include heat treatments that involve pyrolysis and torrefaction. The thermal methods do not effectively remove entrained salts and only serve to concentrate them. Thus thermal processes are not acceptable for the creation of many energy creating products such as organic-carbon-containing feedstock used as a fuel substitute to the likes of coal and petroleum. Additionally, all conventional thermal methods are energy intensive, leading to an unfavorable overall energy balance, and thus economically limiting in the commercial use of organic-carbon-containing feedstock as a renewable source of energy.

The mechanical method, also called pressure extrusion or densification, can be divided into two discrete processes where water and water-soluble salts are forcibly extruded from the organic-carbon-containing material. These two processes are intercellular and intracellular extrusion. The extrusion of intercellular water and intercellular water-soluble salt occurs at a moderate pressure, depending upon the freshness of the organic-carbon-containing material, particle size, initial moisture content, and the variety of organic-carbon-containing material. Appropriately sized particles of freshly cut herbaceous organic-carbon-containing feedstock with moisture content between 50 wt % and 60 wt % will begin extruding intercellular moisture at pressures as low as 1,000 psi and will continue until excessive pressure forces the moisture into the plant cells (essentially becoming intracellular moisture).

As the densification proceeds, higher pressures, and hence higher energy costs, are required to try to extrude intracellular water and intracellular water-soluble salt. However, stiff cell walls provide the biomass material with mechanical strength and are able to withstand high pressures without loss of structural integrity. In addition, the formation of impermeable felts that are more prevalent in weaker cell walled herbaceous material has been observed during compaction of different herbaceous biomass materials above a threshold pressure. This method is energy intensive. In addition, it can only remove up to 50 percent of the water-soluble salts on a dry basis (the intracellular salt remains) and is unable to reduce the remaining total water content to below 30 wt percent.

The felts are formed when long fibers form a weave and are bound together by very small particles of pith. Pith is a tissue found in plants and is composed of soft, spongy parenchyma cells, which store and transport water-soluble nutrients throughout the plant. Pith particles can hold 50 times their own weight in water. As the compression forces exerted during the compaction force water into the forming felts, the entrained pith particles collect moisture up to their capacity. As a result, the moisture content of any felt can approach 90%. When felts form during compaction, regardless of the forces applied, the overall moisture content of the compacted biomass will be substantially higher than it would have been otherwise had the felt not formed. The felt blocks the exit ports of the compaction device as well as segments perpendicular to the applied force, and the water is blocked from expulsion from the compaction device. The felt also blocks water passing through the plant fibers and plant cells resulting in some water passing back through cell wall pores into some plant cells. In addition, it can only remove up to 50 percent of the water-soluble salts on a dry basis and is unable to reduce more than the water content to below 30 wt percent.

The physiochemical method involves a chemical pretreatment of organic-carbon-containing feedstock and a pressure decompression prior to compaction to substantially improve the quality of densified biomass while also reducing the amount of energy required during compaction to achieve the desired bulk density. Chemically, biomass comprises mostly cellulose, hemicellulose, and lignin located in the secondary cell wall of relevant plant materials. The strands of cellulose and hemicellulose are cross-linked by lignin, forming a lignin-carbohydrate complex (LCC). The LCC produces the hydrophobic barrier to the elimination of intracellular water. In addition to the paper pulping process that solubilizes too much of the organic-carbon-containing material, conventional pre-treatments include acid hydrolysis, steam explosion, AFEX, alkaline wet oxidation, and ozone treatment. All of these processes, if not carefully engineered, can be can be expensive on a cost per product weight basis and are not designed to remove more than 25% water-soluble salt on a dry weight basis.

In addition, the energy density generally obtainable from an organic-carbon-containing material is dependent on its type, i.e., herbaceous, soft woody, and hard woody. Also mixing types in subsequent uses such as fuel for power plants is generally undesirable because the energy density of current processed organic-carbon-containing feedstock varies greatly with type of plant material.

As stated above, plant material can be further subdivided in to three sub classes, herbaceous, soft woody and hard woody, each with particular water retention mechanisms. All plant cells have a primary cell wall and a secondary cell wall. As stated earlier, the strength of the material comes mostly from the secondary cell wall, not the primary one. The secondary cell wall for even soft woody materials is thicker than for herbaceous material.

Herbaceous plants are relatively weak-walled plants, include corn, and have a maximum height of less than about 10 to 15 feet (about 3 to 5 meters (M)). While all plants contain pith particles, herbaceous plants retain most of their moisture through a high concentration of pith particles within the plant cells that hold water like balloons because these plants have relatively weak cell walls. Pressure merely deforms the balloons and does not cause the plant to give up its water. Herbaceous plants have about 50% of their water as intracellular water and have an energy density of unprocessed material at about 5.2 million BTUs per ton (MMBTU/ton) or 6 Gigajoules per metric ton (GJ/MT).

Soft woody materials are more sturdy plants than herbaceous plants. Soft woody materials include pines and typically have a maximum height of between 50 and 60 feet (about 15 and 18 M). Their plant cells have stiffer walls and thus need less pith particles to retain moisture. Soft woody materials have about 50% of their water as intracellular water and have an energy density of about 13-14 MMBTU/ton (15-16 GJ/MT).

Hard woody materials are the most sturdy of plants, include oak, and typically have a maximum height of between 60 and 90 feet (18 and 27 M). They have cellulosic plant cells with the thickest secondary cell wall and thus need the least amount of pith particles to retain moisture. Hard woody materials have about 50% of their water as intracellular water and have an energy density of about 15 MMBTU/ton (17 GJ/MT).

There is a need in the energy industry for a system and method to allow the energy industry to use organic-carbon-containing material as a commercial alternative or adjunct fuel source. Much of the land available to grow renewable organic-carbon-containing material on a commercial scale also results in organic-carbon-containing material that has a higher than desired content of water-soluble salt that typically is at levels of at least 4000 mg/kg. Forest products in the Pacific Northwest are often transported via intracoastal waterways, exposing the biomass to salt from the ocean. Thus such a system and method must be able to remove sufficient levels of water-soluble salt to provide a suitable fuel substitute. As an example, boilers generally need salt contents of less than 1500 mg/kg to avoid costly maintenance related to high salt in the fuel. In addition, the energy and resulting cost to remove sufficient water to achieve an acceptable energy density must be low enough to make the organic-carbon-containing material feedstock a suitable alternative in processes to make coal or hydrocarbon fuel substitutes.

There is also a need for a process that can handle the various types of plants and arrive at processed organic-carbon-containing feedstock with similar energy densities.

The invention disclosed does allow the energy industry to use processed organic-carbon-containing material as a commercial alternative fuel source. Some embodiments of the invention remove almost all of the chemical contamination, man-made or natural, and lower the total water content to levels in the range of 5 wt % to 15 wt %. This allows the industries, such as the electric utility industry to blend the organic-carbon-containing feedstock on a ratio of up to 50 wt % processed organic-carbon-containing feedstock to 50 wt % coal with a substantial reduction in the amount of water-soluble salt and enjoy the same MMBTU/ton (GJ/MT) efficiency as coal at coal competitive prices. Literature has described organic-carbon-containing feedstock to coal ratios of up to 30%. A recent patent application publication, EP2580307 A2, has described a ratio of up to 50% by mechanical compaction under heat, but there was no explicit reduction in water-soluble salt content in the organic-carbon-containing feedstock. The invention disclosed herein explicitly comprises substantial water-soluble salt reduction through a reaction chamber with conditions tailored to each specific unprocessed organic-carbon-containing feedstock used. As discussed below, additional purposed rinse subsections and subsequent pressing algorithms in the compaction section of the Reaction Chamber may be beneficial to process organic-carbon-containing feedstock that has a particularly high content of water-soluble salt so that it may be used in a blend with coal that otherwise would be unavailable for burning in a coal boiler. This also includes, for example, hog fuel, mesquite, and Eastern red cedar.

In addition, the invention disclosed does permit different types of organic-carbon-containing feedstock to be processed, each at tailored conditions, to result in processed outputs having preselected energy densities. In some embodiments of the invention, more than one type of feedstock with different energy densities that range from 5.2 to 14 MMBTU/ton (6 to 16 GJ/MT) may be fed into the reaction chamber in series or through different reaction chambers in parallel. Because each type of organic-carbon-containing feedstock is processed under preselected tailored conditions, the resulting processed organic-carbon-containing feedstock for some embodiments of the system of the invention can have a substantially similar energy density. In some embodiments, the energy density is about 17 MMBTU/ton (20 GJ/MT). In others it is about 18, 19, or 20 MMBTU/ton (21, 22, or 23 GJ/MT). This offers a tremendous advantage for down-stream processes to be able to work with processed organic-carbon-containing feedstock having similar energy density regardless of the type used as well as substantially reduced water-soluble content.

The process of the invention uses a beneficiation sub-system to create the processed organic-carbon-containing feedstock that is a clean economical material to be used for creating a satisfactory coal substitute solid fuel from renewable biomass and a pelletizing subsystem for converting the processed organic-carbon-containing feedstock into the solid processed biomass pellets of the invention. The first subsystem will now be discussed.

Beneficiation Sub-System

The beneficiation sub-system is used to make processed organic-carbon-containing feedstock comprises at least three elements, a transmission device, at least one reaction chamber, and a collection device. As used in this document, the beneficiation sub-system refers to the system that is used to convert unprocessed organic-carbon-containing feedstock into processed organic-carbon-containing feedstock.

The first element, the transmission device, is configured to convey into a reaction chamber unprocessed organic-carbon-containing feedstock comprising free water, intercellular water, intracellular water, intracellular water-soluble salt, and at least some plant cells comprising cell walls that include lignin, hemicellulose, and cellulosic microfibrils within fibrils. The transmission device may be any that is suitable to convey solid unprocessed organic-carbon-containing feedstock into the reaction chamber to obtain a consistent residence time of the feedstock in the reaction chamber. The transmission devices include such devices at augers that are well known in the chemical industry.

Particle size of the unprocessed organic-carbon-containing feedstock should be sufficiently small to permit a satisfactorily energy balance as the unprocessed organic-carbon-containing feedstock is passed through the system to create processed organic-carbon-containing feedstock. In some embodiments, the unprocessed organic-carbon-containing feedstock arrives at some nominal size. Herbaceous material such as, for example, energy crops and agricultural waste, should have a particle size where the longest dimension is less than 1 inch (2.5 cm). Preferably, most wood and wood waste that is freshly cut should have a longest length of less than 0.5 inches (1.3 cm). Preferably, old wood waste, especially resinous types of wood such as, for example, pine, has a particle size with a longest dimension of less than 0.25 inches (about 0.6 cm) to obtain the optimum economic outcome, where throughput and energy/chemical consumption are weighed together.

Some embodiments of the system may also include a mastication chamber before the reaction chamber. This mastication chamber is configured to reduce particle size of the organic-carbon-containing feedstock to less than 1 inch (2.5 cm) as the longest dimension. This allows the organic-carbon-containing feedstock to arrive with particle sized having a longest dimension larger than 1 inch (2.5 cm). In some embodiments, the longest dimension is less than 0.75 inches (1.9 cm), and in some less than 0.5 inches (1.3 cm).

Some embodiments of the system may also include a pretreatment chamber to remove contaminants that hinder creation of the passageways for intracellular water and water-soluble salts to pass from the cellulosic-fibril bundles. The chamber is configured to use for each organic-carbon-containing feedstock a particular set of conditions including time duration, temperature profile, and chemical content of pretreatment solution to at least initiate the dissolution of contaminates. The contaminants include resins, rosins, glue, and creosote. The solid slurry, including any incipient felts, may be collected for use as binders in the processed organic-carbon-containing feedstock that is the primary end product. Separate oils may be collected as a stand-alone product such as, for example, cedar oil.

The second element, the reaction chamber, includes at least one entrance passageway, at least one exit passageway, and at least three sections, a wet fibril disruption section, a vapor explosion section, and a compaction section. The first section, the wet fibril disruption section, is configured to break loose at least some of the lignin and hemicellulose between the cellulosic microfibrils in the fibril bundle to make at least some regions of cell wall more penetrable. This is accomplished by at least one of several means. The organic-carbon-containing feedstock is mixed with appropriate chemicals to permeate the plant fibrils and disrupt the lignin, hemicellulose, and LCC barriers. Additionally, the chemical treatment may also unbundle a portion of the cellulose fibrils and/or microfibrils, de-crystallizing and/or de-polymerizing it. Preferably, the chemicals are tailored for the specific organic-carbon-containing feedstock. In some embodiments, the chemical treatment comprises an aqueous solution containing a miscible volatile gas. The miscible gas may include one or more of ammonia, bicarbonate/carbonate, or oxygen. Some embodiments may include aqueous solutions of methanol, ammonium carbonate, or carbonic acid. The use of methanol, for example, may be desirable for organic-carbon-containing feedstock having a higher woody content to dissolve resins contained in the woody organic-carbon-containing feedstock to allow beneficiation chemicals better contact with the fibrils. After a predetermined residence time of mixing, the organic-carbon-containing feedstock may be steam driven, or conveyer by another means such as a piston, into the next section of the reaction chamber. In some embodiments, process conditions should be chosen to not dissolve more than 25 wt % of the lignin or hemicellulose as these are important contributors to the energy density of the processed organic-carbon-containing feedstock. Some embodiments of the system, depending on the specific organic-carbon-containing feedstock used, may have temperatures of at least 135° C., at least 165° C., or at least 180° C.; pressures of at least 260 psig, at least 280 psig, at least 375 psig, or at least 640 psig; and residence times of at least 15 minutes (min), 20 min, or 30 min.

In some embodiments, micro-particles and lignin-rich fragments suspended in the effluent is withdrawn from the reactive chamber for subsequent use. The micro particles and lignin is cleansed of water-soluble salts and other impurities as needed. The resulting slurry, often white, acts as a high energy biomass binder that is then mixed with the processed organic-carbon-containing feedstock before the pelletizing step. This reduces the need for heat during pelletizing.

The second section, the vapor explosion section, is in communication with the wet fibril disruption section. It at least is configured to volatilize plant fibril permeable fluid through rapid decompression to penetrate the more susceptible regions of the cell wall so as to create a porous organic-carbon-containing feedstock with cellulosic passageways for intracellular water and water-soluble salts to pass from the cellulosic-fibril bundles. The organic-carbon-containing feedstock is isolated, heated, pressurized with a volatile fluid comprising steam. The applied volatile chemicals and steam penetrate into the plant fibrils within the vapor explosion section due to the high temperature and pressure. After a predetermined residence time dictated by the specific organic-carbon-containing feedstock used, pressure is released rapidly from the reaction chamber by opening a fast-opening valve into an expansion chamber that may be designed to retain the gases, separate them, and reuse at least some of them in the process for increased energy/chemical efficiency. Some embodiments may have no expansion chamber where retention of gasses is not desired. Some embodiments of the system, depending on the specific organic-carbon-containing feedstock used, may have a specific pressure drop in psig of at least 230, at least 250, at least 345, or at least 600; and explosive durations of less than 500 milliseconds (ms), less than 300 ms, less than 200 ms, less than 100 ms, or less than 50 ms.

Some embodiments may include gas inlets into the wet fibril disruption section of the reaction chamber to deliver compressed air or other compressed gas such as, for example, oxygen. After delivery to the desired pressure, the inlet port would be closed and the heating for the reaction would proceed. Note that this could allow for at least one of three things: First, an increase in total pressure would make subsequent explosion more powerful. Second, an increase in oxygen content would increase the oxidation potential of the processed organic-carbon-containing feedstock where desirable. Third, a provision would be provided for mixing of organic-carbon-containing feedstock, water, and potentially other chemicals such as, for example, organic solvents, through bubbling action of gas through a perforated pipe at bottom of reaction chamber.

The net effect on the organic-carbon-containing feedstock of passing through the wet fibril disruption section and the vapor explosion section is the disruption of fibril cell walls both physically through pressure bursts and chemically through selective and minimal fibril cellulosic delinking, cellulose depolymerization and/or cellulose decrystallization. Chemical effects, such as hydrolysis of the cellulose, lignin, and hemicellulose also can occur. The resulting organic-carbon-containing feedstock particles exhibit an increase in the size and number of micropores in their fibrils and cell walls, and thus an increased surface area. The now porous organic-carbon-containing feedstock is expelled from the vapor explosion section into the next section.

The third section, the compaction section is in communication with the vapor explosion section. The compression section at least is configured to compress the porous organic-carbon-containing feedstock between pressure plates configured to minimize formation of felt that would close the reaction chamber exit passageway made to permit escape of intracellular and intercellular water, and intracellular and intercellular soluble salts. In this section, the principle process conditions for each organic-carbon-containing feedstock is the presence or absence of a raised pattern on the pressure plate, the starting water content, the processed water content, and final water content. The compaction section of the system of the invention requires a raised patterned surface on the pressure plates for feedstock comprising herbaceous plant material feedstock. However, the section may or may not require the raised pattern surface for processing soft woody or hard woody plant material feedstock depending on the specific material used and its freshness from harvest. Some embodiments of the system, depending on the specific organic-carbon-containing feedstock used, may have a starting water contents ranging from 70 to 80 wt %, from 45 to 55 wt % or from 40 to 50 wt %; and processed water content of from 4 to 15 wt % depending on actual targets desired.

The third element, the collection device, is in communication with the reaction chamber. The collection chamber at least is configured to separate non-fuel components from fuel components and to create a processed organic-carbon-containing feedstock. This feedstock has a water content of less than 20 wt % and a water-soluble salt content that is decreased by at least 60% on a dry basis. Some embodiments have the water content less than 20 wt % after allowing for surface moisture to air dry. Some embodiments have a processed organic-carbon-containing feedstock that has a water content of less than 15 wt %. Other embodiments have processed organic-carbon-containing feedstock that has a water content of less than 12 wt %, less than 10 wt %, less than 8 wt %, or less than 5 wt %. Some embodiments have a water-soluble salt content that is decreased by at least 65% on a dry basis. Other embodiments have a water-soluble salt content that is decreased by at least 70% on a dry basis, 75% on a dry basis, at least 80% on a dry basis, at least 85% on a dry basis, at least 90% on a dry basis, or at least 95% on a dry basis.

Some embodiments of the system may further include at least one rinsing subsection. This subsection is configured to flush at least some of the water-soluble salt from the porous organic-carbon-containing feedstock before it is passed to the compaction section. In some embodiments where the salt content is particularly high, such as brine-soaked hog fuel (wood chips, shavings, or residue from sawmills or grinding machine used to create it and also known as "hammer hogs"), the system is configured to have more than one rinsing subsection followed by another compaction section. The separated water, complete with dissolved water soluble salts, may be collected and treated for release into the surrounding environment or even reused in the field that is used to grow the renewable organic-carbon-containing feedstock. The salts in this water are likely to include constituents purposefully added to the crops such as fertilizer and pesticides.

Figure 4:
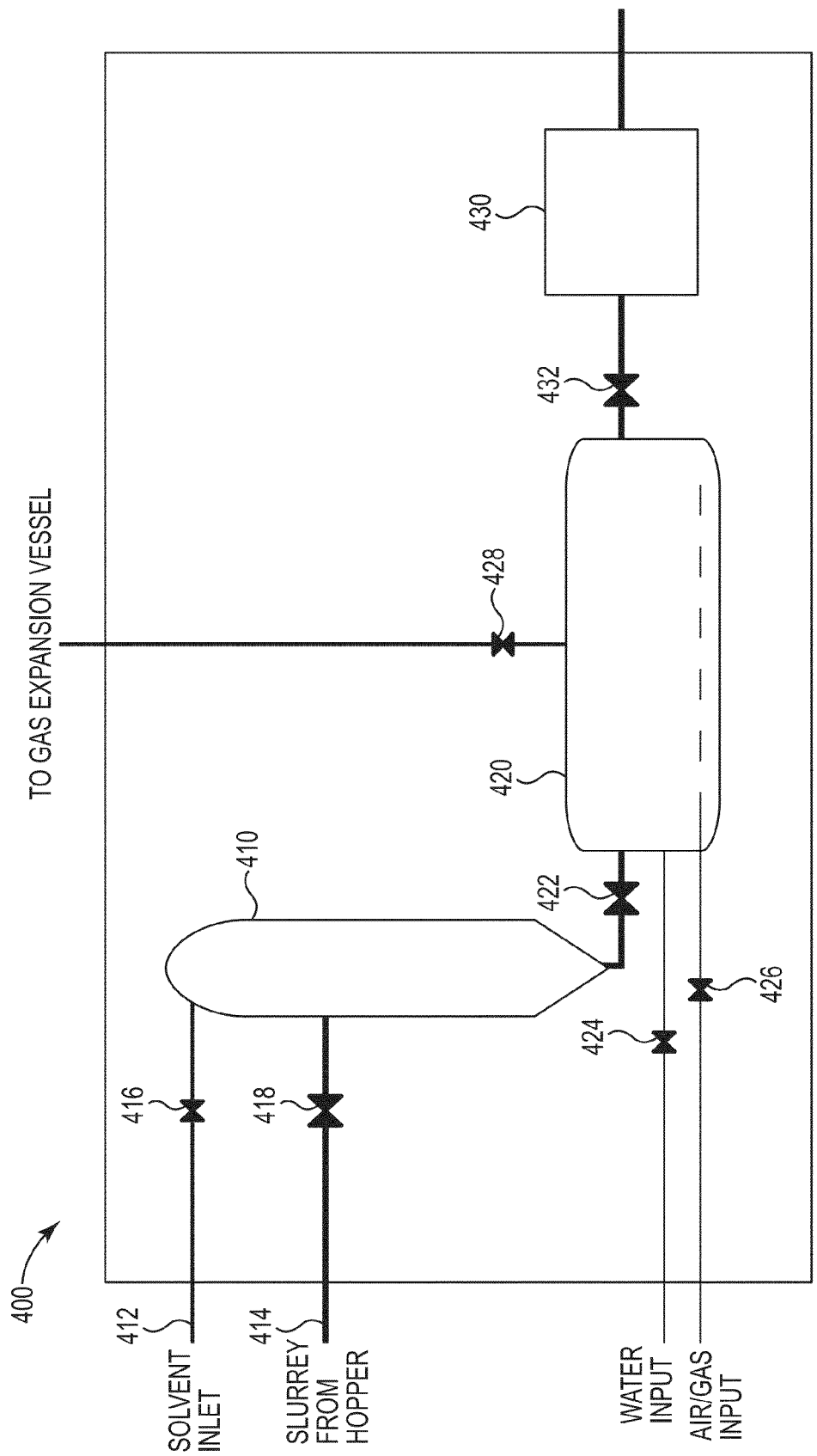
FIG. 4 is a diagram of a side view of an embodiment of a reaction chamber in a beneficiation sub-system.

The beneficiation sub-system of the invention can better be understood through depiction of several figures. FIG. 4 is a diagram of a side view of an embodiment of a reaction chamber in communication with an expansion chamber to retain gasses emitted from the decompressed carbon-containing feedstock. A reaction chamber (400) is shown with a wet fibril disruption section (410). Solvent (412) and unprocessed organic-carbon-containing feedstock (414) that has been chipped to less than 0.5 inches (1.3 cm) are fed into wet fibril disruption section 410 through valves (416) and (418), respectively to become prepared for the next section. The pretreated organic-carbon-containing feedstock is then passed to a vapor explosion section (420) through a valve (422). Valves are used between chambers and to input materials to allow for attainment of specified targeted conditions in each chamber. Volatile expansion fluid, such as water, or water based volatile mixtures, are fed in to vapor expansion chamber 420 through a valve (424). The gas released from the porous organic-carbon-containing feedstock created during decompression is fed through a fast release valve (428) into an expansion chamber (not shown) to retain the gas for possible reuse. The compaction section (430) received the porous organic-carbon-containing feedstock through a valve (432) where the water and water-soluble salt are substantially removed from porous organic-carbon-containing feedstock and it is now processed organic-carbon-containing feedstock.

Figure 5A:
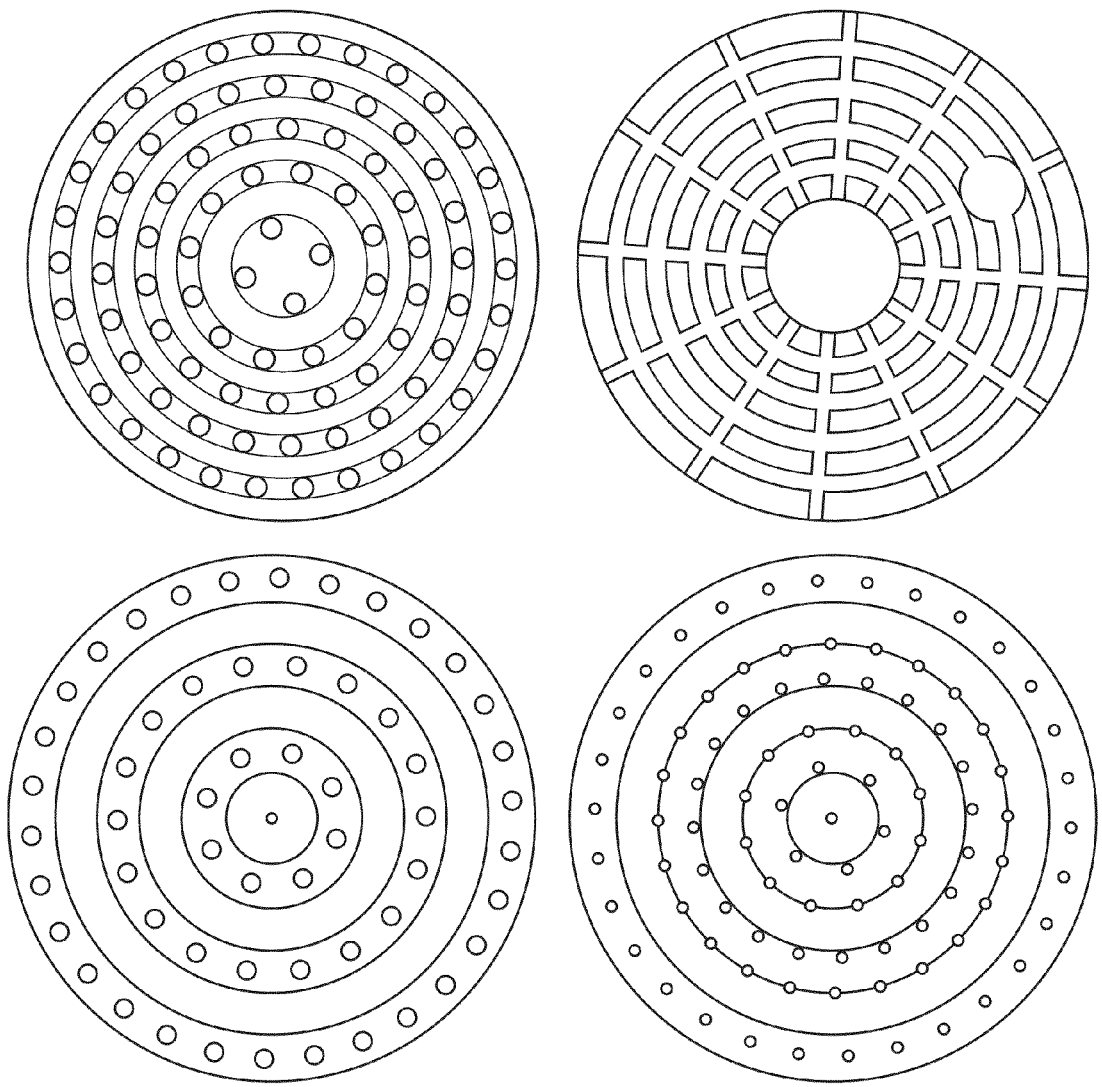
FIG. 5A is a diagram of the front views of various embodiments of pressure plates in a beneficiation sub-system.
Figure 5B:
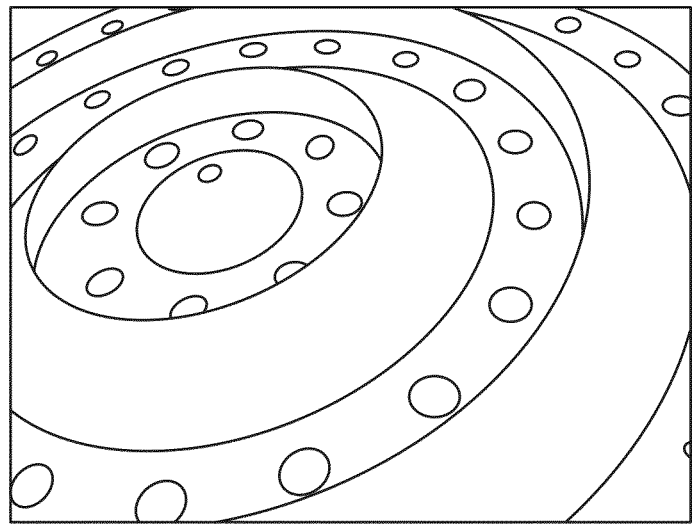
FIG. 5B is a perspective view of a close-up of one embodiment of a pressure plate shown in FIG. 5A.
Figure 5C:
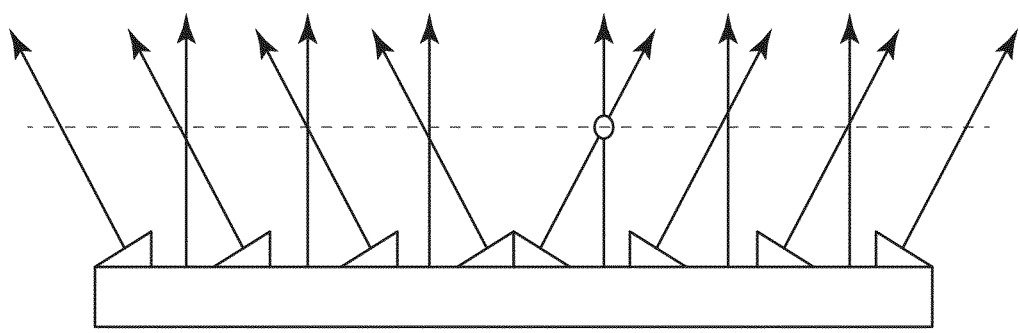
FIG. 5C is a diagram showing the cross-sectional view down the center of a pressure plate with fluid vectors and a particle of pith exposed to the fluid vectors.

As stated above, the pressure plates in the compaction section are configured to minimize felt formation. Felt is an agglomeration of interwoven fibers that interweave to form an impermeable barrier that stops water and water-soluble salts entrained in that water from passing through the exit ports of the compaction section. Additionally, any pith particles that survived the beneficiation process in the first two sections of reaction chamber can be entrained in the felt to absorb water, thereby preventing expulsion of the water during pressing. Therefore, felt formation traps a significant fraction of the water and salts from being extruded from the interior of biomass being compressed. FIGS. 5A, 5B, and 5C show embodiments of pressure plates and how they work to minimize felt formation so that water and water-soluble salts are able to flow freely from the compaction section. FIG. 5A is a diagram of the front views of various embodiments of pressure plates. Shown is the surface of the pressure plate that is pressed against the downstream flow of porous organic-carbon-containing feedstock. FIG. 5B is a perspective view of a close-up of one embodiment of a pressure plate shown in FIG. 5A. FIG. 5C is a diagram showing the cross-sectional view down the center of a pressure plate with force vectors and felt exposed to the force vectors. The upstream beneficiation process in the first two sections of the reaction chamber has severely weakened the fibers in the biomass, thereby also contributing to the minimization of felt formation.

Some embodiments achieve the processed organic-carbon-containing feedstock water content and water-soluble salt reduction over unprocessed organic-carbon-containing feedstock with a cost that is less than 60% that of the cost per weight of processed organic-carbon-containing feedstock from known mechanical, known physiochemical, or known thermal processes. In these embodiments, the reaction chamber is configured to operate at conditions tailored for each unprocessed organic-carbon-containing feedstock and the system is further engineered to re-capture and reuse heat to minimize the energy consumed to lead to a particular set of processed organic-carbon-containing feedstock properties. The reaction chamber sections are further configured as follows. The wet fibril disruption section is further configured to use fibril disruption conditions tailored for each organic-carbon-containing feedstock and that comprise at least a solvent medium, time duration, temperature profile, and pressure profile for each organic-carbon-containing feedstock. The second section, the vapor explosion section, is configured to use explosion conditions tailored for each organic-carbon-containing feedstock and that comprise at least pressure drop, temperature profile, and explosion duration to form volatile plant fibril permeable fluid explosions within the plant cells. The third section, the compaction section, is configured to use compaction conditions tailored for each organic-carbon-containing feedstock and pressure, pressure plate configuration, residence time, and pressure versus time profile.

Figure 6A:
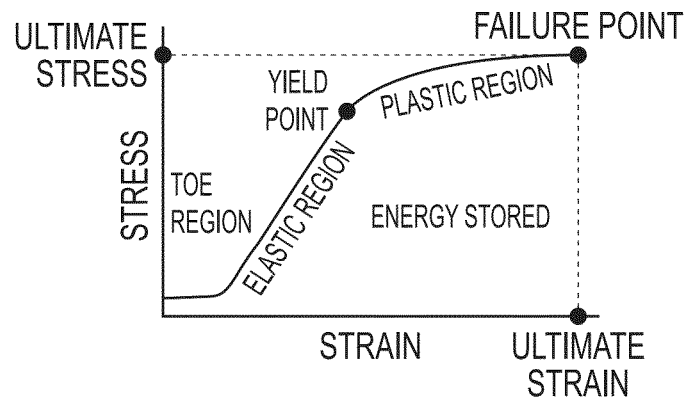
FIG. 6A is a graphical illustration of the typical stress-strain curve for lignocellulosic fibril.

The importance of tailoring process conditions to each organic-carbon-containing feedstock is illustrated by the following discussion on the viscoelastic/viscoplastic properties of plant fibrils. Besides the differences among plants in their cell wall configuration, depending on whether they are herbaceous, soft woody or hard woody, plants demonstrate to a varying degree of some interesting physical properties. Organic-carbon-containing material demonstrates both elastic and plastic properties, with a degree that depends on both the specific variety of plant and its condition such as, for example, whether it is fresh or old. The physics that governs the elastic/plastic relationship of viscoelastic/viscoplastic materials is quite complex. Unlike purely elastic substances, a viscoelastic substance has an elastic component and a viscous component. Similarly, a viscoplastic material has a plastic component and a viscous component. The speed of pressing a viscoelastic substance gives the substance a strain rate dependence on the time until the material's elastic limit is reached. Once the elastic limit is exceeded, the fibrils in the material begin to suffer plastic, i.e., permanent, deformation. FIG. 6A is a graphical illustration of the typical stress-strain curve for lignocellulosic fibril. Since viscosity, a critical aspect of both viscoelasticity and viscoplasticity, is the resistance to thermally activated deformation, a viscous material will lose energy throughout a compaction cycle. Plastic deformation also results in lost energy as observed by the fibril's failure to restore itself to its original shape. Importantly, viscoelasticity/viscoplasticity results in a molecular rearrangement. When a stress is applied to a viscoelastic material, such as a particular organic-carbon-containing feedstock, some of its constituent fibrils and entrained water molecules change position and, while doing so, lose energy in the form of heat because of friction. It is important to stress that the energy that the material loses to its environment is energy that is received from the compactor and thus energy that is expended by the process. When additional stress is applied beyond the material's elastic limit, the fibrils themselves change shape and not just position. A "visco"-substance will, by definition, lose energy to its environment in the form of heat.

Figure 6B:
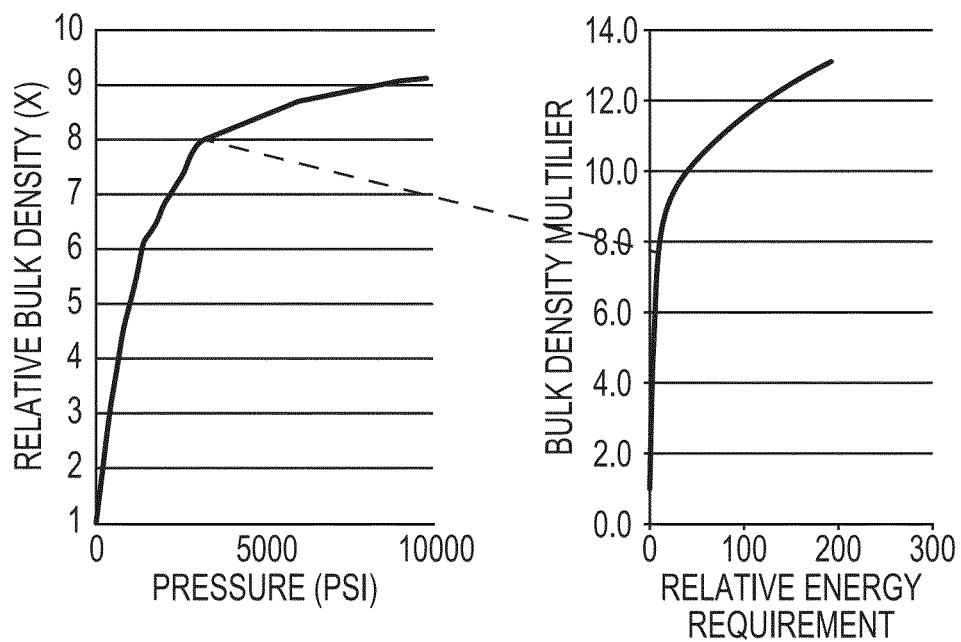
FIG. 6B is a graphical illustration of pressure and energy required to decrease the water content and increase the bulk density of typical organic-carbon-containing feedstock.

An example of how the compaction cycle is optimized for one organic-carbon-containing feedstock to minimize energy consumption to achieve targeted product values follows. Through experimentation, a balance is made between energy consumed and energy density achieved. FIG. 6B is a graphical illustration of pressure and energy required to decrease the water content and increase the bulk density of typical organic-carbon-containing feedstock. Bulk density is related to water content with higher bulk density equaling lower water content. The organic-carbon-containing feedstock compaction process will strike an optimum balance between cycle time affecting productivity, net moisture extrusion together with associated water-soluble salts and minerals, permanent bulk density improvement net of the rebound effect due to viscoelastic/viscoplastic properties of the feedstock, and energy consumption.

Figure 6C:
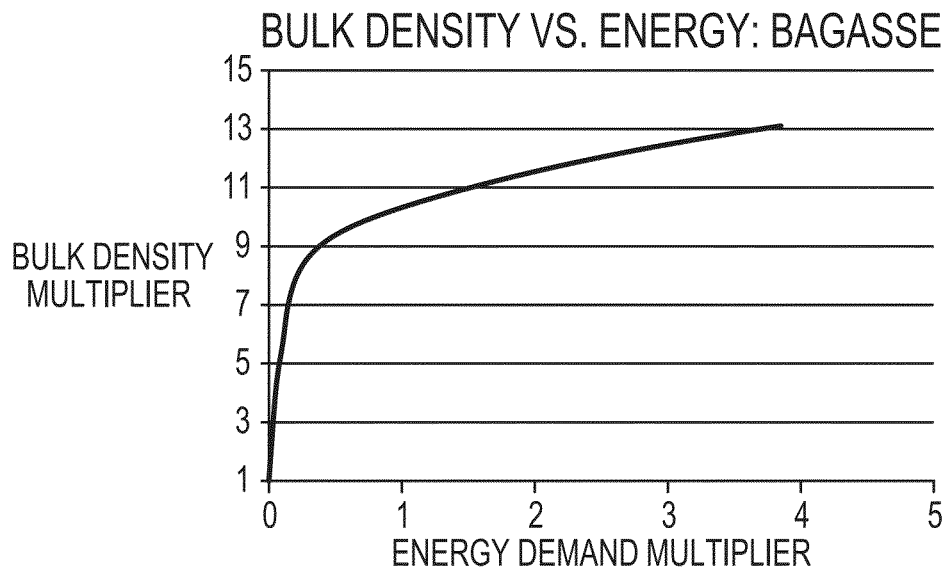
FIG. 6C is a graphical illustration of the energy demand multiplier needed to achieve a bulk density multiplier.
Figure 6D:
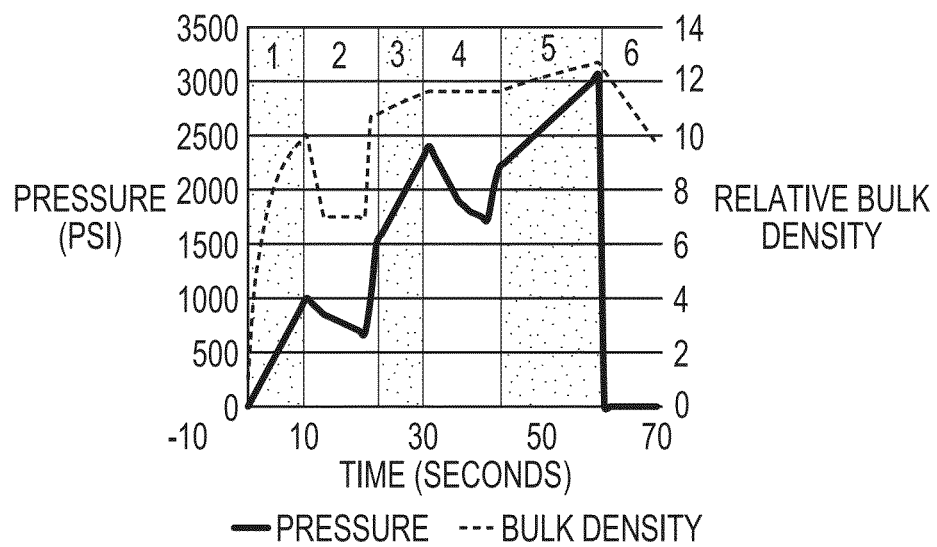
FIG. 6D is a graphical illustration of an example of a pressure cycle for decreasing water content in an organic-carbon-containing feedstock with an embodiment of the invention tailored to a specific the organic-carbon-containing feedstock.

FIG. 6C is an experimentally derived graphical illustration of the energy demand multiplier needed to achieve a bulk density multiplier. The compaction cycle can be further optimized for each variety and condition of organic-carbon-containing feedstock to achieve the desired results at lesser pressures, i.e., energy consumption, by incorporating brief pauses into the cycle. FIG. 6D is a graphical illustration of an example of a pressure cycle for decreasing water content in an organic-carbon-containing feedstock with an embodiment of the invention tailored to a specific organic-carbon-containing feedstock.

In a similar manner, energy consumption can be optimized during the wet fibril disruption and the vapor explosion parts of the system. Chemical pretreatment prior to compaction will further improve the quality of the product and also reduce the net energy consumption. For comparison purposes, the pressure applied to achieve a bulk density multiplier of "10" in FIG. 6C was on the order of 10,000 psi, requiring uneconomically high cost of capital equipment and unsatisfactorily high energy costs to decompress the organic-carbon-containing feedstock.

FIG. 7 is a table illustrating the estimated energy consumption needed to remove at least 75 wt % water-soluble salts from organic-carbon-containing feedstock and reduce water content from 50 wt % to 12 wt % with embodiments of the invention compared with known processes. Waste wood with a starting water content of 50 wt % was used in the estimate to illustrate a side-by-side comparison of three embodiments of the invention with known mechanical, physiochemical, and thermal processes. The embodiments of the system selected use a fibril swelling fluid comprising water, water with methanol, water with carbon dioxide bubbled into it produces carbonic acid $H_2CO_3$. As seen in the table, and discussed above, known mechanical processes are unable to reduce the water content to 12 wt %, known physiochemical processes are unable to reduce water-soluble salt content by over 25 wt %, and known thermal processes are unable to remove any water-soluble salt. The total energy requirement per ton for the three embodiments of the invention, that using methanol and water, carbon dioxide and water, and just water is 0.28 MMBTU/ton (0.33 GJ/MT), 0.31 MMBTU/ton (0.35 GJ/6T), and 0.42 MMBTU/ton (0.49 GJ/MT), respectively. This is compared to 0.41 MMBTU/ton (0.48 GJ/MT), 0.90 MMBTU/ton (1.05 GJ/MT), and 0.78 MMBTU/ton (0.93 GJ/MT) for known mechanical, known physiochemical, and known thermal processes, respectively. Thus, the estimated energy requirements to remove water down to a content of less than 20 wt % and water-soluble salt by 75 wt % on a dry basis for embodiments of the system invention to less than 60% that of known physiochemical and known thermal processes that are able to remove that much water and water-soluble salt. In addition, the system invention is able to remove far more water-soluble salt than is possible with known physiochemical and known thermal processes that are able to remove that much water.

Figure 8:
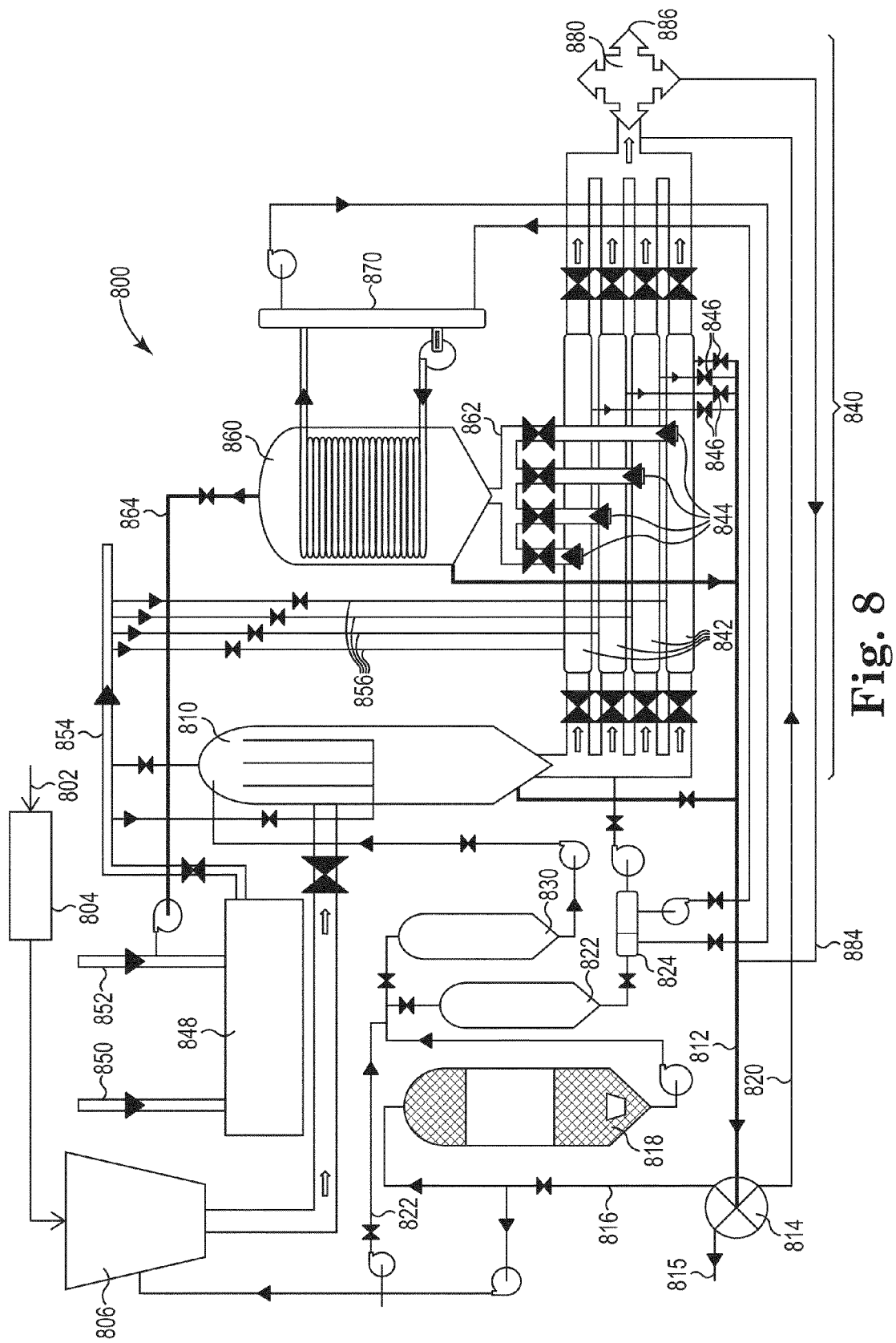
FIG. 8 is a diagram of a side view of an embodiment of a beneficiation sub-system having four reaction chambers in parallel, a pretreatment chamber, and a vapor condensation chamber.

Multiple reaction chambers may be used in parallel to simulate a continuous process. FIG. 8 is a diagram of a side view of an embodiment of a beneficiation sub-system having four reaction chambers in parallel, a pretreatment chamber, and a vapor condensation chamber. A system (800) includes an input section (802) that delivers organic-carbon-containing feedstock to system 800. Feedstock passes through a mastication chamber (804) prior to entry into an organic-carbon-containing feedstock hopper ((806) from where is passes on to a pretreatment chamber (810). Contaminants are removed through a liquid effluent line (812) to a separation device (814) such as a centrifuge and having an exit stream (815) for contaminants, a liquid discharge line (816) that moves liquid to a filter media tank (818) and beyond for reuse, and a solid discharge line (820) that places solids back into the porous organic-carbon-containing feedstock. Liquid from the filter medial tank 818 is passed to a remix tank (822) and then to a heat exchanger (824) or to a second remix tank (830) and to pretreatment chamber 810. The organic-carbon-containing feedstock passes onto one of four reaction chambers (840) comprising three sections. The first section of each reaction chamber, a wet fibril disruption section (842), is followed by the second section, a vapor explosion section (844), and a rinsing subsection (846). A high pressure steam boiler (848) is fed by a makeup water line (850) and the heat source (not shown) is additionally heated with fuel from a combustion air line (852). The main steam line (854) supplies steam to pretreatment chamber 810 and through high pressure steam lines (856) to reaction chambers 840. A vapor expansion chamber (860) containing a vapor condensation loop is attached to each vapor explosion sections with vapor explosion manifolds (862) to condense the gas. A volatile organic components and solvent vapor line (864) passes the vapor back to a combustion air line (852) and the vapors in vapor expansion chamber 860 are passes through a heat exchanger (870) to capture heat for reuse in reaction chamber 840. The now porous organic-carbon-containing feedstock now passes through the third section of reaction chamber 840, a compaction section (880). Liquid fluid passes through the liquid fluid exit passageway (884) back through fluid separation device (814) and solid processed organic-carbon-containing feedstock exits at (886).

Pelletizing Sub-System

The pelletizing sub-system is used to convert the processed organic-carbon-containing feedstock from the beneficiation sub-system into the pellets suitable for use in electricity-making power plants. The pelletizing sub-system comprises a compression chamber and a collection chamber. The a compression chamber is configured to separate the processed organic-carbon-containing feedstock into discrete units of mass having a longest length of at least 0.16 inch (4.0 cm) and a density of at least 37.5 pounds per cubic foot (0.60 grams per cubic centimeter) to form processed biomass pellets. In some embodiments the compression is done under heat. In other embodiments, the slurry of micro particles and lignin from the reactor of the beneficiation sub-system, discussed above, is mixed with the processed organic-carbon-containing feedstock before compression. This results in the need for little if any heat or high energy biomass binder to form the processed biomass pellets. The collection chamber is configured to gather an aggregate of processed biomass pellets.

In some embodiments, the pelletizing sub-system further comprises a heating chamber configured to apply sufficient heat to the processed organic-carbon-containing feedstock to reduce its water content to less than 10% by weight and form pellets. In some embodiments, the compression chamber and the heating chamber are the same chamber.

In some embodiments, the vapor explosion section of the beneficiation sub-system further comprises a wash element that is configured to remove and clean micro particles of unprocessed organic-carbon-containing feedstock, lignin fragments, and hemicellulosic fragments from the vapor explosion section into a fine, sticky mass of biomass with high lignin content. In this embodiment, the blending chamber of the blending subsection, discussed below, is further configured to receive the fine, sticky mass of biomass to permit at least one of lower temperatures or less if any additional high energy biomass binder content in a compaction chamber formation during formation of blended compact aggregates.

Figure 9:
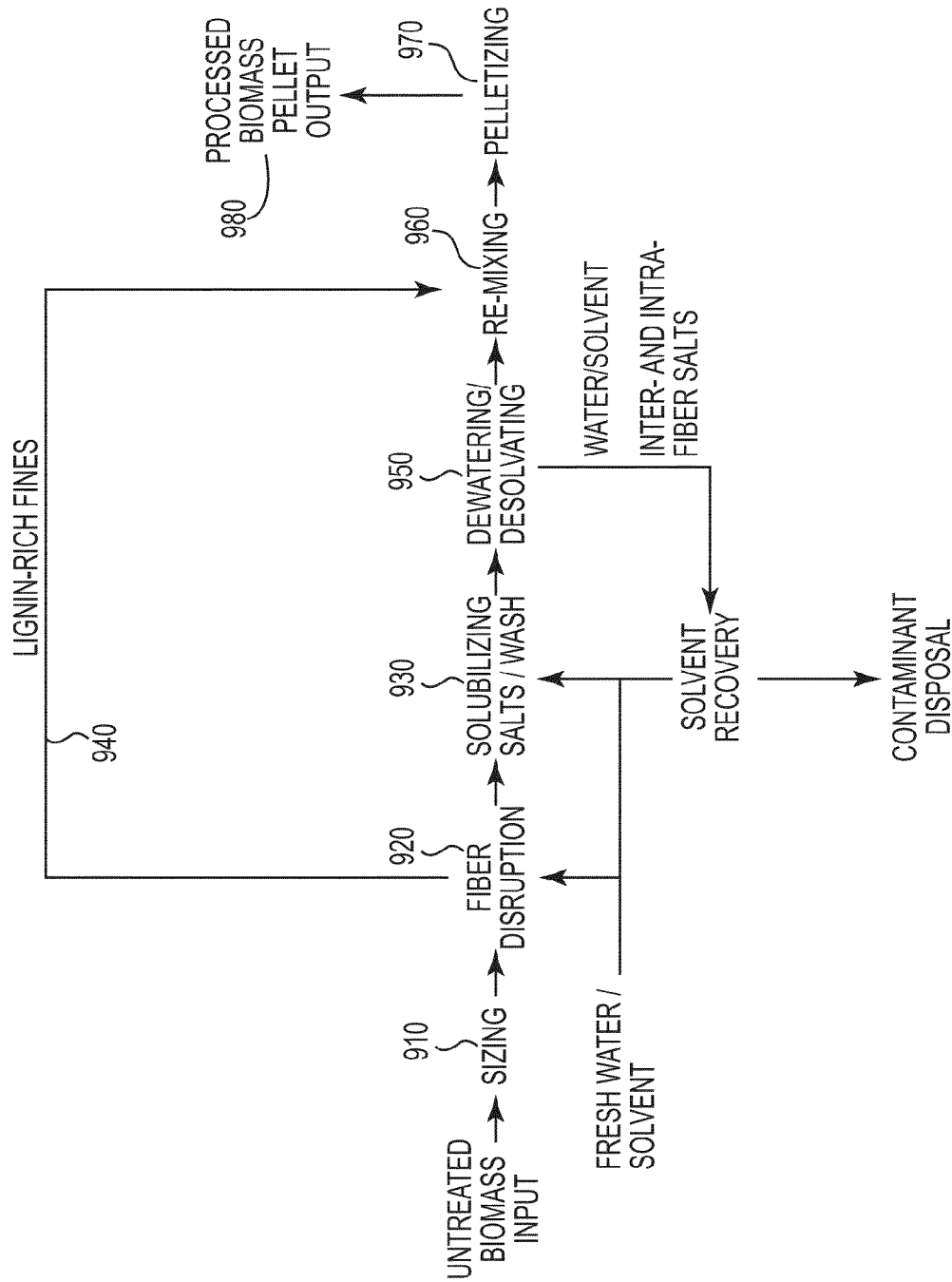
FIG. 9 is a diagram of a process to make pellets from unprocessed organic-carbon-containing feedstock.

FIG. 9 is a diagram of a process to make pellets from unprocessed organic-carbon-containing feedstock with the addition of micro particle and lignin slurry that is optional. In this embodiment, the unprocessed organic-carbon-containing feedstock, untreated biomass input, is sized (910), then passed through beneficiation reaction chamber where the fibers are disrupted (920), the salt is solubilized and the feedstock is then washed (930). During this step, the effluent containing micro particles and lignin is removed (940), washed and introduced to the processed organic-carbon-containing feedstock in a remixing step (960) after it has gone through a dewatering and desolvating step (950). The mixture is then pelletized (970) and collected (980). The use of the washed effluent stream serves to reduce the need for heat to form the pellets although heat still may be advantageous to remove additional water.

Beneficiation Sub-System Process

The beneficiation process step comprises the step of passing unprocessed organic-carbon-containing feedstock through a beneficiation sub-system process to result in processed organic-carbon-containing feedstock having a water content of less than 20 wt % and a salt content that is reduced by at least 60 wt % on a dry basis for the processed organic-carbon-containing feedstock from that of the unprocessed organic-carbon-containing feedstock. There are two aspects of the beneficiation sub-system process. The first focuses on the properties of the processed organic-carbon-containing feedstock and the second focuses on the energy efficiency of the process of the invention over that of currently known processes for converting unprocessed organic-carbon-containing feedstock into processed organic-carbon-containing feedstock suitable for use with downstream fuel producing systems. Both use the beneficiation sub-system disclosed above.

First Aspect

The first aspect of the beneficiation process step of the invention comprises four steps. The first step is inputting into a reaction chamber unprocessed organic-carbon-containing feedstock comprising free water, intercellular water, intracellular water, intracellular water-soluble salts, and at least some plant cells comprising cell walls that include lignin, hemicellulose, and microfibrils within fibrils. Some embodiments have unprocessed organic-carbon-containing feedstock that comprises water-soluble salts having a content of at least 4000 mg/kg on a dry basis.

The second step is exposing the feedstock to hot solvent under pressure for a time at conditions specific to the feedstock to make at least some regions of the cell walls comprising crystallized cellulosic fibrils, lignin, and hemicellulose more able to be penetrable by water-soluble salts without dissolving more than 25 percent of the lignin and hemicellulose. As mentioned above, this is accomplished by one or more of unbundling regions of at least some fibrils, depolymerizing at least some strands of lignin and/or hemicellulose, or detaching them from the cellulose fibrils, thereby disrupting their interweaving of the fibrils. In addition, the cellulose fibrils and microfibrils can be partially depolymerized and/or decrystallized. In some embodiments, micro particles and lignin that is removed in an effluent stream is further cleansed of water-soluble salts and other impurities as needed before it is subsequently mixed with the processed organic-carbon-containing feedstock before pelletizing.

The third step is rapidly removing the elevated pressure so as to penetrate the more penetrable regions with intracellular escaping gases to create porous feedstock with open pores in at least some plant cell walls. In some embodiments the pressure is removed to about atmospheric pressure in less than 500 milliseconds (ms), less than 300 ms, less than 200 ms, less than 100 ms, or less than 50 ms.

The fourth step is pressing the porous feedstock with conditions that include an adjustable compaction pressure versus time profile and compaction time duration, and between pressure plates configured to prevent felt from forming and blocking escape from the reaction chamber of intracellular and intercellular water and intracellular water-soluble salts, and to create processed organic-carbon-containing feedstock that has a water content of less than 20 wt % and a water-soluble salt content that is decreased by at least 60% on a dry basis that of the unprocessed organic-carbon-containing feedstock. In some embodiments, the water content is measured after subsequent air-drying to remove remaining surface water. In some embodiments, the pressure plate has a pattern that is adapted to particular organic-carbon-containing feedstock based on its predilection to form felts and pith content as discussed above. In some embodiments, the pressure amount and pressure plate configuration is chosen to meet targeted processed organic-carbon-containing feedstock goals for particular unprocessed organic-carbon-containing feedstock. In some embodiments, the pressure is applied in steps of increasing pressure, with time increments of various lengths depending on biomass input to allow the fibers to relax and more water-soluble salt to be squeezed out in a more energy efficient manner. In some embodiments, clean water is reintroduced into the biomass as a rinse and to solublize the water-soluble slats before the fourth step begins.

The process may further comprise a fifth step, prewashing the unprocessed organic-carbon-containing feedstock before it enters the reaction chamber with a particular set of conditions for each organic-carbon-containing feedstock that includes time duration, temperature profile, and chemical content of pretreatment solution to at least initiate the dissolution of contaminates that hinder creation of the cell wall passageways for intracellular water and intracellular water-soluble salts to pass outward from the interior of the plant cells.

The process may further comprise a sixth step, masticating. The unprocessed organic-carbon-containing feedstock is masticated into particles having a longest dimension of less than 1 inch (2.5 centimeters) before it enters the reaction chamber.

The process may further comprise a seventh step, separating out the contaminants. This step involves the separating out of at least oils, waxes, and volatile organic compounds from the porous feedstock with solvents less polar than water.

As with the system aspect, the unprocessed organic-carbon-containing feedstock may comprise at least two from a group consisting of an herbaceous plant material, a soft woody plant material, and a hard woody plant material that are processed in series or in separate parallel reaction chambers. In addition, in some embodiments, the energy density of each plant material in the processed organiccarbon-containing feedstock may be substantially the same. In some embodiments, the organic-carbon-containing feedstock comprises at least two from the group consisting of an herbaceous plant material, a soft woody plant material, and a hard woody plant material, and wherein the energy density of each plant material in the processed organic-carbon-containing feedstock is at least 17 MMBTU/ton (20 GJ/MT).

Figure 10:
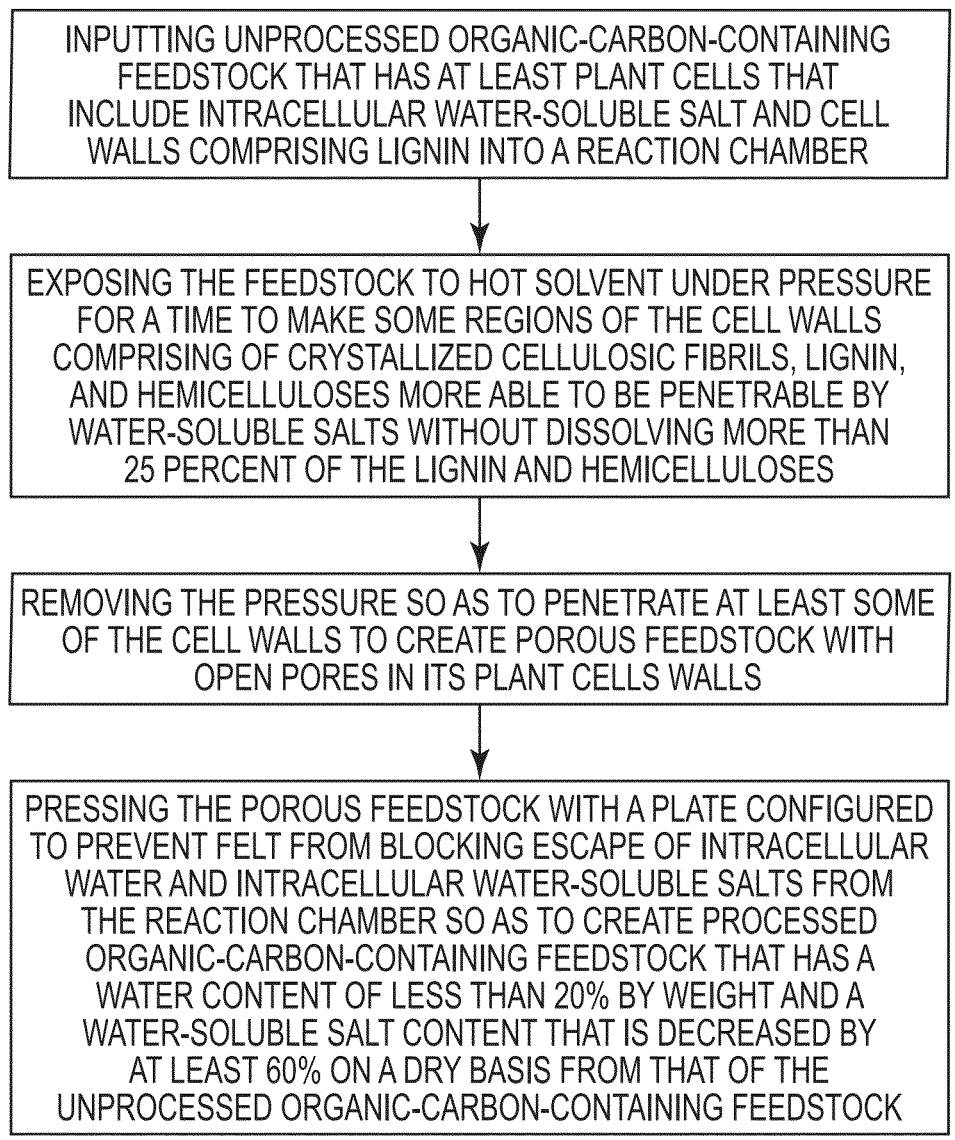
FIG. 10 is a block diagram of an embodiment of a process for passing unprocessed organic-carbon-containing feedstock through a beneficiation sub-system to create a processed organic-carbon-containing feedstock with a water content of less than 20 wt % and a water-soluble salt content that is decreased by more than 60 wt % on a dry basis for the processed organic-carbon-containing feedstock from that of unprocessed organic-carbon-containing feedstock.

FIG. 10 is a block diagram of a process for making processed organic-carbon-containing feedstock with less than 60 percent water-soluble salt on a dry basis over that of its unprocessed form and with less than 20 wt % water. Step 1710 involves inputting unprocessed organic-carbon-containing feedstock that has at least some plant cells that include intracellular water-soluble salt and cell walls comprising lignin into a reaction chamber. Step 1720 involves exposing the feedstock to hot solvent under pressure for a time to make some regions of the cell walls comprising crystallized cellulosic fibrils, lignin, and hemicellulose more able to be penetrable by water-soluble salts without dissolving more than 25 percent of the lignin and hemicelluloses. Step 1730 involves removing the pressure so as to penetrate at least some of the cell walls so as to create porous feedstock with open pores in its plant cell walls. Step 1740 involves pressing the porous feedstock with a plate configured to prevent felt from blocking escape of intracellular water and intracellular water-soluble salts from the reaction chamber so as to create processed organic-carbon-containing feedstock that has a water content of less than 20 wt % and a water-soluble salt content that is decreased by at least 60 wt % on a dry basis for the processed organic-carbon-containing feedstock from that of unprocessed organic-carbon-containing feedstock.

Second Aspect

The second aspect is similar to the first except steps have an efficiency feature and the resulting processed organic-carbon-containing feedstock has a cost feature. The second aspect also comprises four steps. The first step is inputting into a reaction chamber organic-carbon-containing feedstock comprising free water, intercellular water, intracellular water, intracellular water-salts, and at least some plant cells comprising lignin, hemicellulose, and fibrils within fibril bundles. Each step emphasizes more specific conditions aimed at energy and material conservation. The second step is exposing the feedstock to hot solvent under pressure for a time at conditions specific to the feedstock to swell and unbundle the cellular chambers comprising partially crystallized cellulosic fibril bundles, lignin, hemicellulose, and water-soluble salts without dissolving more than 25 percent of the lignin and to decrystallize at least some of the cellulosic bundles. The third step is removing the pressure to create porous feedstock with open pores in its cellulosic chambers. After possibly mixing with fresh water to rinse the material and solublize the water-soluble salts, the fourth step is pressing the porous feedstock with an adjustable compaction pressure versus time profile and compaction duration between pressure plates configured to prevent felt from forming and blocking escape from the reaction chamber of intracellular and intercellular water and intracellular water-soluble salts, and to create a processed organic-carbon-containing feedstock that has a water content of less than 20 wt %, a water-soluble salt content that is decreased by at least 60 wt % on a dry basis, and a cost per weight of removing the water and the water-soluble salt is reduced to less than 60% of the cost per weight of similar water removal from known mechanical, known physiochemical, or known thermal processes.

Figure 11:
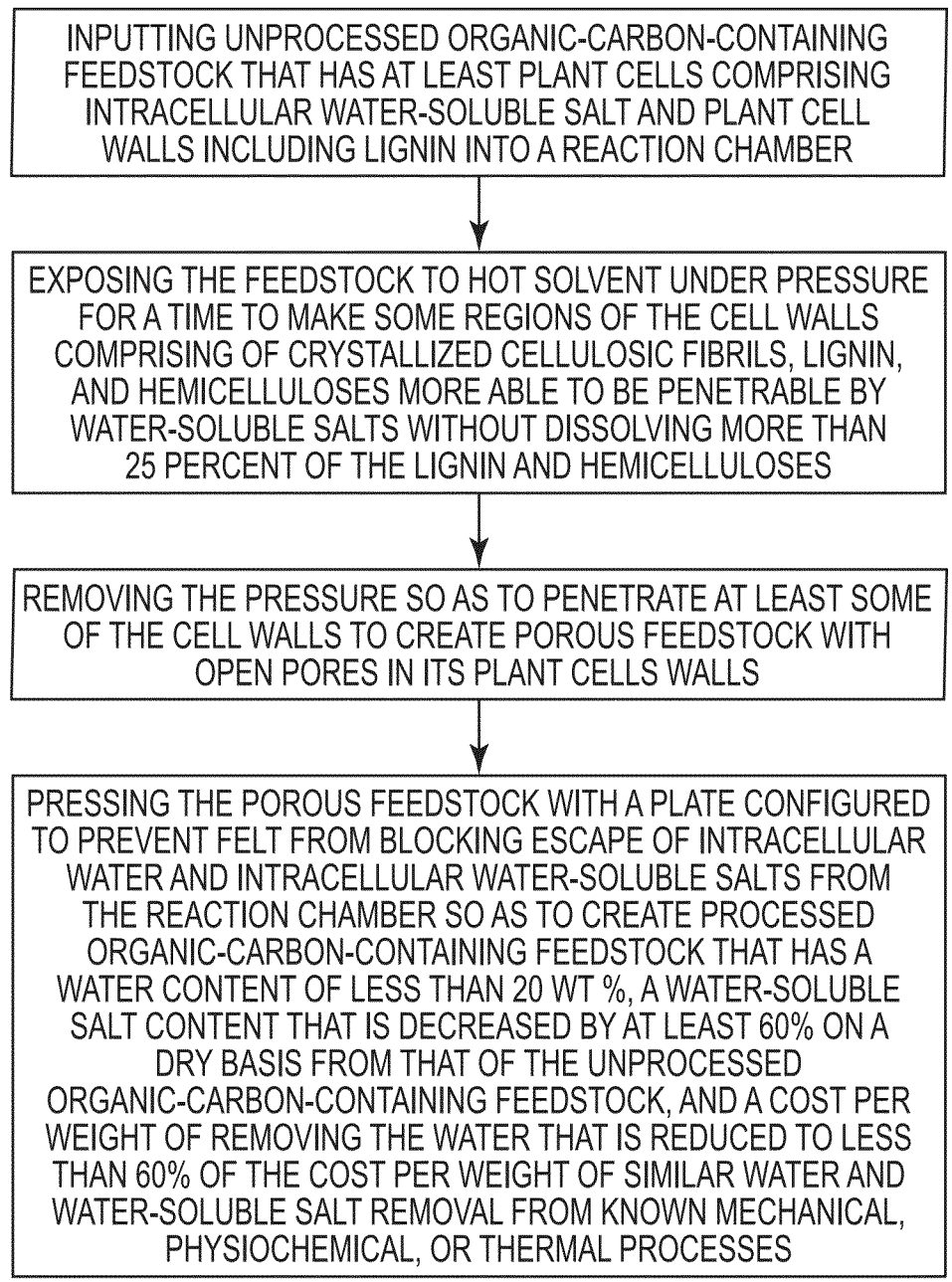
FIG. 11 is a block diagram of an embodiment of a process for passing unprocessed organic-carbon-containing feedstock through a beneficiation sub-system to create a processed organic-carbon-containing feedstock with a water content of less than 20 wt %, a water-soluble salt content that is decreased by more than 60 wt % on a dry basis for the processed organic-carbon-containing feedstock from that of unprocessed organic-carbon-containing feedstock, and an energy cost of removing the water-soluble salt and water that is reduced to less than 60% of the cost per weight of similar removal from known mechanical, known physiochemical, or known thermal processes.

FIG. 11 is a block diagram of a process for making processed organic-carbon-containing feedstock with less than 50 wt % water-soluble salt of a dry basis than that of unprocessed organic-carbon-containing feedstock and less than 20 wt % water, and at a cost per weight of less than 60% that of similar water removal from known mechanical, known physiochemical, or known thermal processes that can remove similar amounts of water and water-soluble salt. Step 1810 involves inputting unprocessed organic-carbon-containing feedstock that has at least plant cells comprising intracellular water-soluble salts and plant cell walls that include lignin into a reaction chamber. Step 1820 involves exposing the feedstock to hot solvent under pressure for a time to make some regions of the cell walls comprising of crystallized cellulosic fibrils, lignin, and hemicellulose more able to be penetrable by water-soluble salts without dissolving more than 25 percent of the lignin and hemicelluloses. Step 1830 involves removing the pressure so as to penetrate at least some of the cell walls to create porous feedstock with open pores in its plant cell walls. Step 1840 involves pressing the porous feedstock with a plate configured to prevent felt from blocking escape of intracellular water and intracellular water-soluble salts from the reaction chamber so as to create processed organic-carbon-containing feedstock that has a water content of less than 20 wt %, a water-soluble salt content that is decreased by at least 60 wt % on a dry basis over that of unprocessed organic-carbon-containing feedstock, and a cost per weight of removing the water and water-soluble salt that is reduced to less than 60% of the cost per weight of similar water removal from known mechanical, physiochemical, or thermal processes.

Energy efficiencies are achieved in part by tailoring process conditions to specific organic-carbon-containing feedstock as discussed above. Some embodiments use systems engineered to re-capture and reuse heat to further reduce the cost per ton of the processed organic-carbon-containing feedstock. Some embodiments remove surface or free water left from the processing of the organic-carbon-containing feedstock with air drying, a process that takes time but has no additional energy cost. FIG. 12 is a table that shows some process variations used for three types of organic-carbon-containing feedstock together with the resulting water content and water-soluble salt content achieved. It is understood that variations in process conditions and processing steps may be used to raise or lower the values achieved in water content and water-soluble salt content and energy cost to achieve targeted product values. Some embodiments have achieved water contents as low as less than 5 wt % and water-soluble salt contents reduced by as much as over 95 wt % on a dry basis from its unprocessed feedstock form.

Pelletizing Sub-System Process

The pelletizing sub-system process step comprises two steps. The first step is compressing the processed organic-carbon-containing feedstock to separate it into pellets with discrete units of mass having a longest length of at least 0.16 inch (4.0 cm), a diameter of less than 0.25 inch (6 mm), and a density of at least 37.5 pounds per cubic foot (0.60 grams per cubic centimeter). The second step is collecting the aggregate of pellets. In some embodiments the compression is done under heat to at least assist the formation of aggregates or reduce the content of water to less than 10% by weight. In some embodiments, the steps of compression and heating are done at the same time. In some embodiments, the beneficiation sub-system process further comprises removing and cleaning of micro particles of unprocessed organic-carbon-containing feedstock, lignin fragments, and hemicellulosic fragments from the vapor explosion section into a fine, sticky mass of biomass with high lignin content in the removing the pressure step, and the blending sub-system further comprises adding the fine, sticky mass of biomass to the blended powder to permit lower temperatures in the compressing step during formation of blended compact aggregates.

Various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A process of making processed biomass pellets, comprising:
    inputting into a first or beneficiation sub-system a renewable unprocessed organic-carbon-containing feedstock that includes free water, intercellular water, intracellular water, intracellular water-soluble salts, and at least some plant cells comprising cell walls that include lignin, hemicellulose, and microfibrils within fibrils;
    passing the unprocessed organic-carbon-containing feedstock through the first sub-system, a beneficiation sub-system process, to produce processed organic-carbon-containing feedstock having a water content of less than 20 wt % and a water soluble intracellular salt content that is reduced by at least 60 wt % on a dry basis from that of the unprocessed organic-carbon-containing feedstock; and
    passing the processed organic-carbon-containing feedstock through a second sub-system, a pelletizing sub-system, to produce, in processed biomass pellets, a solid renewable fuel composition having an energy density of at least 17 MMBTU/ton (20GJ/MT) a water content of less than 10 wt % and water-soluble intracellular salt that is decreased by at least 60 wt % on a dry basis from that of the unprocessed organic-carbon-containing feedstock,
    wherein passing the unprocessed organic-carbon-containing feedstock through the first sub-system further comprises:
        exposing the unprocessed organic-carbon-containing feedstock to solvent heated to at least 135° C. under a pressure of at least 260 psig for a residence time of at least 15minutes;
        removing the pressure so as to create porous feedstock in the plant cell walls; and
        pressing the porous feedstock to produce organic-carbon-containing feedstock that has a water content of less than 20 wt % and a water-soluble intracellular salt content that is decreased by at least 60 wt % on a dry basis from that of unprocessed organic-carbon-containing feedstock, and
    wherein passing the processed organic-carbon-containing feedstock through the second subsystem further comprises:
        compressing the processed organic-carbon-containing feedstock so as to separate it into pellets with discrete units of mass having the longest length of at least 4.0 cm and a density of at least 0.6 grams/cubic centimeter; and
        collecting an aggregate of processed biomass pellets.

2. The process of claim 1 wherein the pelletizing sub-system process, further comprises the step of heating the processed organic-carbon-containing feedstock to reduce its water content to less than 10% by weight.

3. The process of claim 1 wherein the pelletizing sub-system process steps of compressing and exposing the unprocessed organic-carbon-containing feedstock to heated solvent are done at the same time.

4. The process of claim 1, wherein the solvent is heated to a temperature selected from at least 165° C. and at least 180° C.

5. The process of claim 1, wherein the pressure is selected from at least 280 psig, at least 375 psig, and at least 640 psig.

6. The process of claim 1, wherein the residence time is selected from at least 20 minutes and at least 30 minutes.

7. The process of claim 1, wherein exposing the unprocessed organic-carbon-containing feedstock to solvent is performed without dissolving more than 25 percent of the lignin and hemicellulose.

\* \* \* \* \*